United States Patent [19]

Yamamoto et al.

[11] Patent Number: 5,666,419
[45] Date of Patent: Sep. 9, 1997

[54] ENCRYPTION DEVICE AND COMMUNICATION APPARATUS USING SAME

[75] Inventors: Takahisa Yamamoto; Keiichi Iwamura, both of Kawasaki, Japan

[73] Assignee: Canon Kabushiki Kaisha, Tokyo, Japan

[21] Appl. No.: 350,110

[22] Filed: Nov. 29, 1994

[30] Foreign Application Priority Data

Nov. 30, 1993 [JP] Japan .................................. 5-299303
Dec. 27, 1993 [JP] Japan .................................. 5-331241

[51] Int. Cl.$^6$ .................................................. H04L 9/00
[52] U.S. Cl. ................................................ 380/28; 380/46
[58] Field of Search ............................ 380/28, 30, 46; 364/746, 717

[56] References Cited

U.S. PATENT DOCUMENTS

| | | | |
|---|---|---|---|
| 4,366,549 | 12/1982 | Katayama | 364/746 |
| 4,514,592 | 4/1985 | Miyaguchi | 380/30 |
| 4,747,848 | 5/1988 | Walby | 364/746 |
| 5,010,573 | 4/1991 | Musyck et al. | 380/28 |
| 5,046,036 | 9/1991 | Tezuka | 364/717 |
| 5,297,206 | 3/1994 | Orton | 380/30 |
| 5,321,752 | 6/1994 | Iwamura et al. | 380/28 |
| 5,448,639 | 9/1995 | Arazi | 380/30 |
| 5,479,365 | 12/1995 | Ogura | 364/746 |
| 5,513,133 | 4/1996 | Cressel et al. | 364/746 |

FOREIGN PATENT DOCUMENTS 531158 3/1993 European Pat. Off. .

OTHER PUBLICATIONS

"Comparison of Two Pseudo-Random Number Generators", Lenore Blum, et al., Advances in Cryptology, Proceedings of Crypto 82, Santa Barbara, California, Aug. 23-25, 1982.

Evanjelos Kranakis, "Primality of Cryptography", J. Wiley & Sons, 1986, pp. 108-137.

Shigeo Tsujii, et al., "Cryptography and Information Security" [Shokodo] 1990, p. 86.

Shinichi Ikeno, et al., "Modern Cryptographic Theory", [Denshi Joho Tsushin Gakkai], 1986, pp. 14-15 & 95-96.

Keiichi Iwamura, et al., "Exponential Algorithm and Systolic Array using the Montgomery Method", ISEC vol. 92, No. 134, 1992, pp. 49-54.

Computers & Security, vol. 10, No. 3, May, 1991, Amsterdam NL, pp. 263-267, Denis Laurichesse, et al., "Optimized Implementation of RSA Cryptosystem".

The Transactions of the Institute of Electronics, Information and Communication Engineers, vol. J75-A, No. 8, pp. 1301-1311, Aug. 25, 1992, Keiichi Iwamura et al., "An Implementation Method for RSA Crypto-system with Parallel Processing".

IEEE Transactions on Information Theory, vol. IT-22, No. 6, Nov. 1976, pp. 644-654, Whitfield Diffie et al., "New Directions in Cryptography".

Mathematics of Computation, vol. 44, No. 170, pp. 519-521, Apr. 1985, Peter L. Montgomery, "Modular Multiplication Without Trial Division".

*Primary Examiner*—Salvatore Cangialosi

[57] ABSTRACT

In a modular multiplication circuit which operates under the conditions $0<N<2^n$, $0 \leq A$, $B<2N$, $R=2^{n+2}$, a first multiplier performs multiplication between input values A and B. A second multiplier performs multiplication between the output of the first multiplier and $[-(N^{-1} \bmod R)]$, which is decided by set parameters N and R, and outputs M. A third multiplier performs multiplication between the output M and the set parameter N and outputs the product M×N. An adder adds the output of the first multiplier and the output of the third multiplier, and a shift register shifts the sum leftward by n+2 bits. Thus, an output $P=(A \times B + M \times N)/R$ is produced.

18 Claims, 16 Drawing Sheets

ENCRYPTION DEVICE AND COMMUNICATION APPARATUS USING SAME

BACKGROUND OF THE INVENTION

This invention relates to an encryption device for performing encoded communication in home banking, farm banking and electronic mail in a computer network and in various communication services such as electronic conferencing. Furthermore, the invention relates to an encryption device for performing encrypted communication using an encryption method that employs modular multiplication (quadratic residual ciphers, RSA ciphers, ElGamal ciphers, etc.), a key distribution method (DH-type key distribution method, an ID-based key distribution method, etc.), a zero-knowledge authentication system, etc.

Further, the invention relates to a communication method and apparatus which employ random-number generation necessary in encrypted communication, particularly data concealment, originator/terminator authentication, distribution of encryption key and a zero-knowledge authentication protocol, etc. The invention relates also to a method and apparatus for random-number generation as necessary in a Monte Carlo simulation, by way of example.

The importance of cryptographic techniques to protect the content of data has grown with the rapid advances that have recently been made in information communication systems using computer networks. In particular, high-speed encryption is becoming essential as computer networks are being developed for higher speed and larger volume.

Among the foregoing, modular multiplication is a particularly important operation used in various cryptographic techniques. Various methods of encryption using modular multiplication will now be described.

Two methods of encryption which are well known are a secret-key cryptosystem and a public-key cryptosystem.

In a public-key cryptosystem, the encryption and decryption keys differ. The encryption key is known publicly but the decryption key is held in secrecy by the receiving party and it is difficult to infer the decryption key from the publicly disclosed encryption key. Ciphers based upon modular multiplication, such as RSA ciphers and ElGamal ciphers, are used widely in public-key cryptosystem. Attention is being given to the fact that these ciphers have an application called authentication in addition to a secret communication function. Authentication, which is a function for investigating whether a party transmitting communication text is correct or not, is also referred to as a digital signature. In a digital signature which uses these ciphers, secret signatures known only to the transmitting party are possible and cannot be forged. Accordingly, a digital signature is secure and often finds use as a form of authentication communication in financial facilities.

In a secret-key cryptosystem, in which the same key is shared in secrecy by both the sending and receiving parties, use is made of random numbers referred to as quadratic residues obtained from an operation employed in modular multiplication.

The above-mentioned public-key cryptosystem and secret-key cryptosystem methods are often used together with a key-delivery system or key distribution system. A well known example of the key-delivery system is DH-type key delivery developed by Diffie and Hellman. These systems also implement operations using modular multiplication. Furthermore, an ID-based key distribution method is attracting attention as a key distribution method. Modular multiplication is used in various key distribution methods.

In addition, zero-knowledge authentication is available as an encryption technique. This is a method in which one party convinces another party of the fact that it possesses certain knowledge without letting the other party know of the content of the information.

The details of the foregoing are described in "Modern Cryptographic Theory" [*Denshi Joho Tsushin Gakkai* (1986)], by Shinichi Ikeno and Kenji Koyama, and "Cryptography and Information Security", *Shokodo* (1990)], by Shigeo Tsujii and Masao Kasahara.

It should be appreciated from the foregoing that if an efficient modular multiplication circuit and method can be realized, this will make it possible to implement a variety of encryption systems efficiently.

A technique referred to as the Montgomery method (Montgomery, P. L: "Modulator Multiplication without Trial Division", Math. Of Computation, Vol. 44, 1985, pp. 519–521) is known as a method of performing modular multiplication of $P = A \cdot B \cdot R^{-1} \mod N$ (where R and N are relatively prime integers) The Montgomery method makes it possible to perform modular multiplication without division. This will now be described.

[Description of Montgomery Method]

A theorem derived by Montgomery is as follows: "When N and R are relatively prime integers and $N' = -N^{-1} \mod R$ holds, arbitrary integers T, $(T + M \cdot N)/R$ satisfy the following relationship:

$$(T + M \cdot N)/R = T \cdot R^{-1} \mod N \quad (A\text{-}1)$$

where $M = T \cdot N' \mod R$ holds.

In accordance with the Montgomery method, therefore, in a case where modular multiplication: $P = A \cdot B \cdot R^{-1} \mod N$ is to be executed, this can be carried out in the manner $$P = A \cdot B \cdot R^{-1} \mod N = (A \cdot B + M \cdot N)/R \quad (A\text{-}2)$$

where $$M = A \cdot B \cdot N' \mod R \quad (A\text{-}3)$$

using an integer R which is prime with respect to N.

In a case where N is an odd number, R is a prime integer with respect to N if $R = 2^r$ (where r is any integer) holds. In this case, division by R entails a bit shift only and, hence, the operation of Equation (A-2) can be executed in simple fashion by multiplication and addition.

With the Montgomery method, however, cases arise in which the range of output values of modular multiplication becomes larger than the range of input values. For example, letting the ranges of the values of inputs A and B be expressed by $$0 \leq A, B < N$$

the operation of the Montgomery method indicated by Equations (A-2), (A-3)

$$P = (A \cdot B + M \cdot N)/R = (C + M) \cdot N/R$$

where $C = A \cdot B/N$ is executed.

If $C + M > R$ holds in this case, then $(C + M)/R > 1$ will hold and we will have $$P = (A \cdot B + M \cdot N)/R > N$$

That is, there will be cases in which a value $P > N$ is outputted with respect to inputs of $0 < A$, $B < N$.

As a consequence, it is difficult to repeat modular multiplication by a circuit or method which implements the Montgomery method. Further, the operation of modular multiplication generally used in cryptographic techniques is $$Q = A \cdot B \bmod N$$

In order to realize such modular multiplication, it is necessary to repeat the Montgomery method a plurality of times. This makes it difficult to execute this operation efficiently using the Montgomery method.

Further, with regard to a sequence of random numbers used in encrypted communication, it is required that random numbers generated after a certain point in time not be readily predictable from a sequence of random numbers generated up to this point in time. In the literature "Primality and Cryptography" (by Evangelos Kranakis, published by John Wiley & Sons, pp. 108–137), a sequence of pseudorandom numbers satisfying the above-mentioned requirement is described.

Specifically, if we let a sequence of pseudorandom numbers be represented by $b_1, b_2, \ldots$, a bit $b_i$ is given by $$X_{i+1} = X_i^2 \bmod N \; (i=0, 1, 2, \ldots) \quad \text{(B-1)}$$

$$b_i = lsb(X_i) \; (i=1, 2, \ldots) \quad \text{(B-2)}$$

where $X_0$ is an initial value given arbitrarily and p, q are prime numbers in which $p \equiv q \equiv 3 \pmod{4}$ holds (it should be noted that $N = p \cdot q$ holds and lsb represents least significant bit). A different method of generating a sequence of pseudorandom numbers is described in the literature "Cryptography and information Security" (by Shigeo Tsujii and Masao Kasahara, published by *Shokodo*, pp. 86).

Specifically, if we let a sequence of pseudorandom numbers be represented by $b_1, b_2, \ldots$, a bit $b_i$ is given by $$x_{i+1} = x_i^e \bmod N \; (i=0, 1, 2, \ldots) \quad \text{(B-3)}$$

$$b_i = lsb(x_i) \; (i=1, 2, \ldots) \quad \text{(B-4)}$$

where $x_0$ is an initial value given arbitrarily p, q are prime numbers and e is a relatively prime number with respect to L (L is a least common multiple of p-1 and q-1). $N = p \cdot q$ holds and lsb represents least significant bit.

It is known that obtaining $b_{i+1}$ solely from the sequence of pseudorandom numbers $b_1, b_2, \ldots, b_i$ generated by these methods would require an amount of labor tantamount to that needed to factorize N. In other words, it is known that the amount of computation for obtaining pseudorandom numbers to be generated from a certain point in time onward from a sequence of pseudorandom numbers generated up to this point in time is equivalent to the amount of computation needed to factorize N. However, in order to make the factorization of N difficult in terms of amount of computation, it is required that p, q be made of several hundred bits. Random numbers thus generated by a method through which it is made difficult, in terms of amount of computation, to predict random numbers to be generated from a certain point in time onward from a sequence of random numbers generated up to this point in time are referred to as pseudorandom numbers considered cryptologically secure.

The operations of Equations (B-1) and (B-3) are included in the operation referred to as modular multiplication indicated by the following equation:

$$Q = \upsilon \cdot v \bmod N \quad \text{(B-5)}$$

(where Q, $\upsilon$, v are integers.)

The above-mentioned Montgomery method is known as a method of performing modular multiplication efficiently. If the Montgomery method is used, the operation can be carried out without performing division by modulus N. As a result, processing can be executed more efficiently than with ordinary modular multiplication.

If we let modular multiplication for a case in which the Montgomery method is used be represented by Mont $(\upsilon, v)$, then Mont $(\upsilon, v)$ will be given by $$\text{Mont}(\upsilon, v) \equiv \upsilon \cdot v \cdot R^{-1} \pmod{N} \quad \text{(B-6)}$$

using R, which is a relatively prime number with respect to N.

In order to obtain the computational result Mont $(\upsilon, v)$ of the above equation with the Montgomery method, the following operation is carried out:

$$\text{Mont}(\upsilon, v) = (\upsilon \cdot v + M \cdot N)/R \quad \text{(B-7)}$$

where $$M = \upsilon \cdot v \cdot N' \bmod R \quad \text{(B-8)}$$

$$N' = -N^{-1} \bmod R \quad \text{(B-9)}$$

In a case where N is an odd number, R and N are relatively prime integers if $R = 2^t$ (where t is any integer) holds. In this case, division by R and modular multiplication essentially need not be performed and Mont $(\upsilon, v)$ can be executed at high speed solely by multiplication and addition.

The procedure for performing a quadratic residue operation in a case where the Montgomery method is used is given by $$y_0 = R \cdot X_0 \bmod N \quad \text{(B-10)}$$

$$y_{i+1} = R^{-1} \cdot y_i^2 \bmod N \; (i=0, 1, 2, \ldots) \quad \text{(B-11)}$$

using the same parameters as in Equation (B-1) and R, which is a relatively prime number with respect to N.

In this case, when the sequences generated by Equations (B-1) and (B-11) are compared, we have $$y_i = R \cdot X_i \bmod N \; (i=0, 1, 2, \ldots) \quad \text{(B-12)}$$

and the sequence $y_i$ ($i=0, 1, 2, \ldots$) generated by Equation (B-11) is obtained by multiplying the sequence $X_i$ ($i=0, 1, 2 \ldots$) generated by Equation (B-1) by R. Accordingly, in order to generate $b_i$, which is a series of the least significant bit of $X_i$, as a pseudorandom number sequence which is cryptologically secure, it is required that the following operation be performed with regard to Yi obtained by computation:

$$X_i = R^{-1} \cdot y_i \bmod N \; (i=0, 1, 2, \ldots) \quad \text{(B-13)}$$

Equation (B-3) can be executed by repeating the modular exponentiation operation indicated by Equation (B-5). More specifically, the procedure for successively computing modular exponentiation $x_{i+1} = x_i^e \bmod N$ ($i=0, 1, 2, \ldots$) by repeating modular multiplication is as indicated by "Algorithm 1" below. It should be noted that e is an integer comprising k bits and. is represented by $e = [e_k, e_{k-1}, \ldots e_2, e_1]$.

[Algorithm 1]
INPUT $x_0$, e, N, s  (**1)
FOR i = 0 TO s  (**2)

```
-continued
x_{i+1} = 1
FOR j = k TO 1
    IF e_j = 1 THEN x_{i+1} = x_{i+1} · x_i mod N
    IF j > 1 THEN x_{i+1} = x_{i+1} · x_{i+1} mod N
NEXT
OUTPUT x_{i+1} (= x_i^e mod N)
NEXT                                                    (**9)
```

With the INPUT statement of line (1), values of $x_0$, e, N, s are entered. Here s is the iteration number of the residual operation. The FOR statement of line (2) is a command for repeating the processing up to line (**9) from "0" to "s" in relation to the function i. This statement causes repetition of processing for successively obtaining the modular exponentiation $x_{i+1}$ (i=0, 1, 2, . . . ,s).

The procedure for computing the modular exponentiation $x_{i+1} = x^{ie}$ mod N by repeating modular multiplication using the computation procedure of the Montgomery method is as shown below. It should be noted that R is a relatively prime integer with respect to N and e is an integer comprising k bits, as mentioned earlier, where $e = [e_k, e_{k-1}, \ldots e_2, e_1]$. If this algorithm is executed, the series $x_i$ (i=0, 1, 2, . . . ,s), which is obtained by Equation (B-2), can be acquired.

```
[Algorithm 2]
INPUT x_0, e, N, s, R_R = R^2 mod N
FOR i = 0 TO s
    y_i = Mont (x_i, R_R)                              (*1)
    y_{i+1} = Mont (1, R_R)                            (*2)
    FOR j = k TO 1
        IF e_j = 1 THEN y_{i+1} = Mont(y_{i+1}, y_i)
        IF j > 1 THEN y_{i+1} = Mont(y_{i+1}, y_{i+1})
    NEXT
    x_{i+1} = Mont (y_{i+1}, 1)                        (*3)
    OUTPUT x_{i+1} (= x_i^e mod N)
NEXT
```

In a case where Equation (B-2) is computed by the Montgomery method in accordance with Algorithm 2, the series $y_{i+1}$ (i=0, 1, 2, . . . , s) obtained as the output of the FOR-NEXT portion with respect to j is represented by $$y_0 = R \cdot x_0 \bmod N \qquad (B\text{-}14)$$

$$y_{i+1} = R^{-(e-1)} \cdot y_i^e \bmod N \; (i=0, 1, 2, \ldots) \qquad (B\text{-}15)$$

using the same parameters as in Equation (B-1) and R, which is a relatively prime number with respect to N.

In this case, when the sequence $x_{i+1}$ (i=0, 1, 2, . . . ) generated by Equation (B-3) and the sequence $y_{i+1}$ (i=0, 1, 2, . . . ) generated by Equation (B-15) are compared, we have $$y_i = R \cdot X_i \bmod N \; (i=0, 1, 2, \ldots). \qquad (B\text{-}16)$$

In other words, in a case where Equation (B-3) is computed by the Montgomery method in accordance with Algorithm 2, the sequence Yi+1 (i=0, 1, 2, . . . s) obtained as the output of the FOR-NEXT portion with respect to j is the relation of Equation (B-16) with regard to the sequence $x_{i+1}$ (i=0, 1, 2, . . . s) obtained by Equation (B-3).

Accordingly, in order to obtain the operational result $x_{i+1}$ ($x_i^e$ mod N), which is obtained by Algorithm 1 of a modular exponentiation operation which does not employ the Montgomery method with regard to the input $x_i$, by Algorithm 2 of a modular exponentiation operation which does employ the Montgomery method, it is necessary to correct $x_i$ to $y_i$=Mont ($x_i, R_R$) (=$R \cdot x_i$ mod N) by the equation (*1) of Algorithm 2 and correct $y_{i+1}$, which is obtained as the output of the FOR-NEXT portion with respect to j to $x_{i+1}$=Mont ($y_{i+1}$, 1) (=$R^{-1} \cdot y_{i+1}$ mod N) by equation (*3).

However, in a case where the secure pseudorandom number generating method described above is used, it is required that p, q be made several hundred bits. As a result, a large amount of computation is involved. In particular, the amount of computation for the portions of Equations (B-1), (B-3) is large. Consequently, pseudorandom numbers Cannot be generated at high speed and generation/reproduction of communication data cannot be performed at a high speed on the basis of these pseudo-random numbers.

SUMMARY OF THE INVENTION

Accordingly, an object of the present invention is to provide an encryption device, as well as a communication apparatus using this device, in which it is possible to execute modular multiplication of $P = A \cdot B \cdot R^{-1}$ mod N, without changing the ranges of input/output values, using the Montgomery method, whereby encryption is performed by executing modular multiplication efficiently.

Another object of the present invention is to provide an encryption device, as well as a communication apparatus using this device, in which encryption is performed by executing modular multiplication of $Q = A \cdot B$ mod N efficiently by the Montgomery method.

A further object of the present invention is to provide a communication method and apparatus in which secure pseudorandom numbers can be generated at a higher speed and more easily, wherein the pseudorandom numbers are used to perform generation/reproduction of communication data at a high speed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the detailed description, serve to explain the principles of the invention.

DESCRIPTION OF THE PREFERRED EMBODIMENTS

Preferred embodiments of the present invention will now be described with reference to the accompanying drawings.

<First Embodiment>

Figure 1:
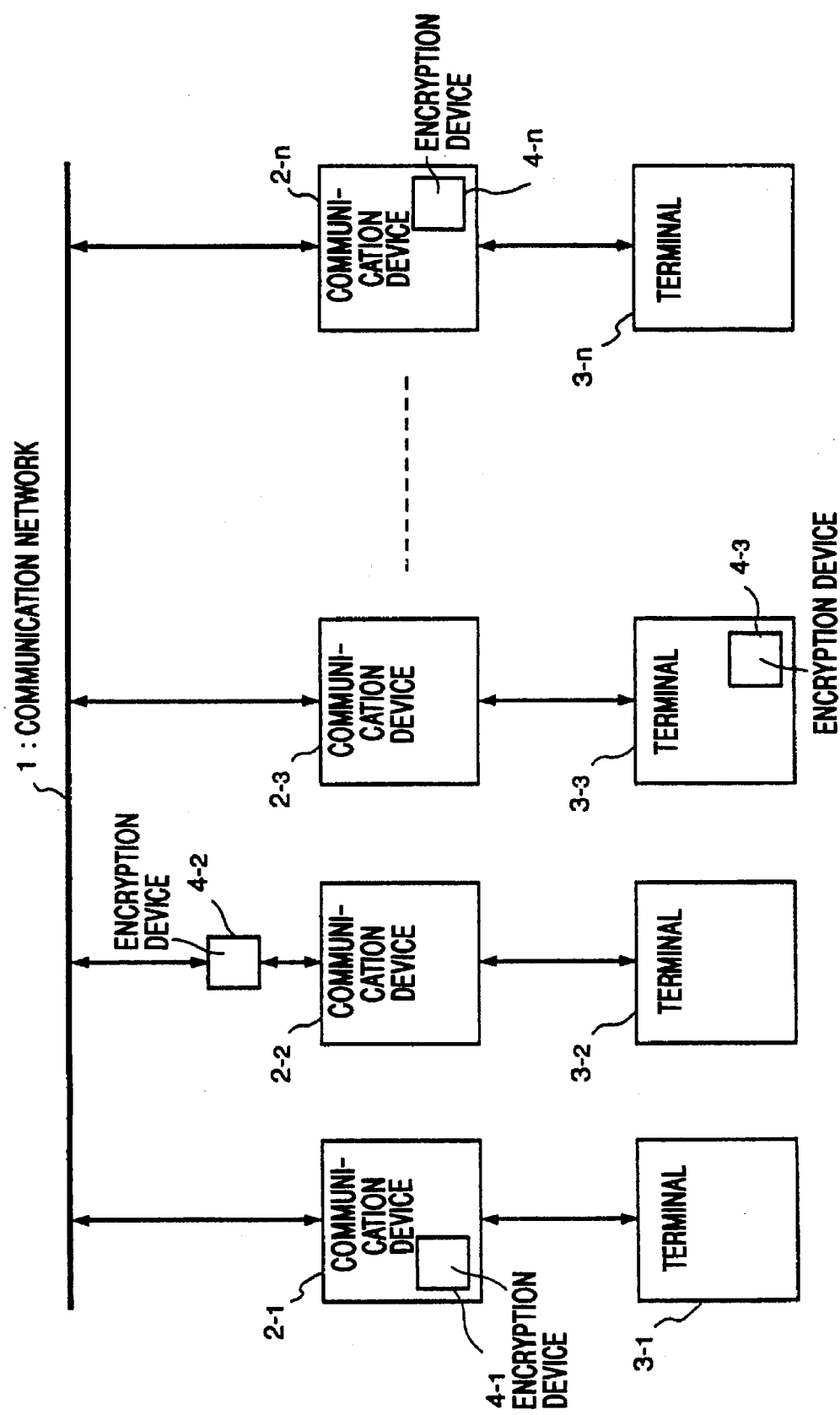
FIG. 1 is a diagram showing the configuration of an encryption system according to an embodiment of the present invention.

FIG. 1 is a diagram illustrating the configuration of an encryption system according to a first embodiment of the invention. This embodiment deals with an encryption system in an n vs. n communication arrangement of the kind shown in FIG. 1. Numeral 1 denotes a communication network. In this embodiment the network is a local communication network, such as a local area network (LAN) or a wide area communication network, such as a telephone circuit. Communication devices $2_{-1} \sim 2_{-n}$ are connected to the network 1 and to terminals $3_{-1} \sim 3_{-n}$, which can be accessed by users. (When the communication devices are referred to generically below, the term "communication device 2" will be used.) The users employ the terminals $3_{-1} \sim 3_{-n}$ to create data. (When the terminals are referred to generically below, the term "terminal 3" will be used.)

Encryption devices $4_{-1} \sim 4_{-n}$ encrypt input data that is to be transmitted and then output the encrypted data. (When the encryption devices are referred to generically below, the term "encryption device 4" will be used.) The encryption device 4 is incorporated in the communication device 2 (which is the case in encryption device $4_{-1}$), inserted between the communication device 2 and communication network 1 (which is the case in encryption device $4_{-2}$), or is incorporated in the terminal 3 connected to the communication device 2 (which is the case in encryption device $4_{-1}$). Even if the encryption device 4 has not been connected to the communication device, it is possible to incorporate the encryption device in a portable device, such as an IC card, which can be used upon being connected to the communication device 2 or terminal 3 when necessary. Users who employ the 10 communication devices 2 or terminals 3 perform secret communication, authentication communication or encrypted communication such as key distribution, zero-knowledge authentication, etc., by the encryption devices having modular multiplication circuits according to this embodiment.

Figure 2:
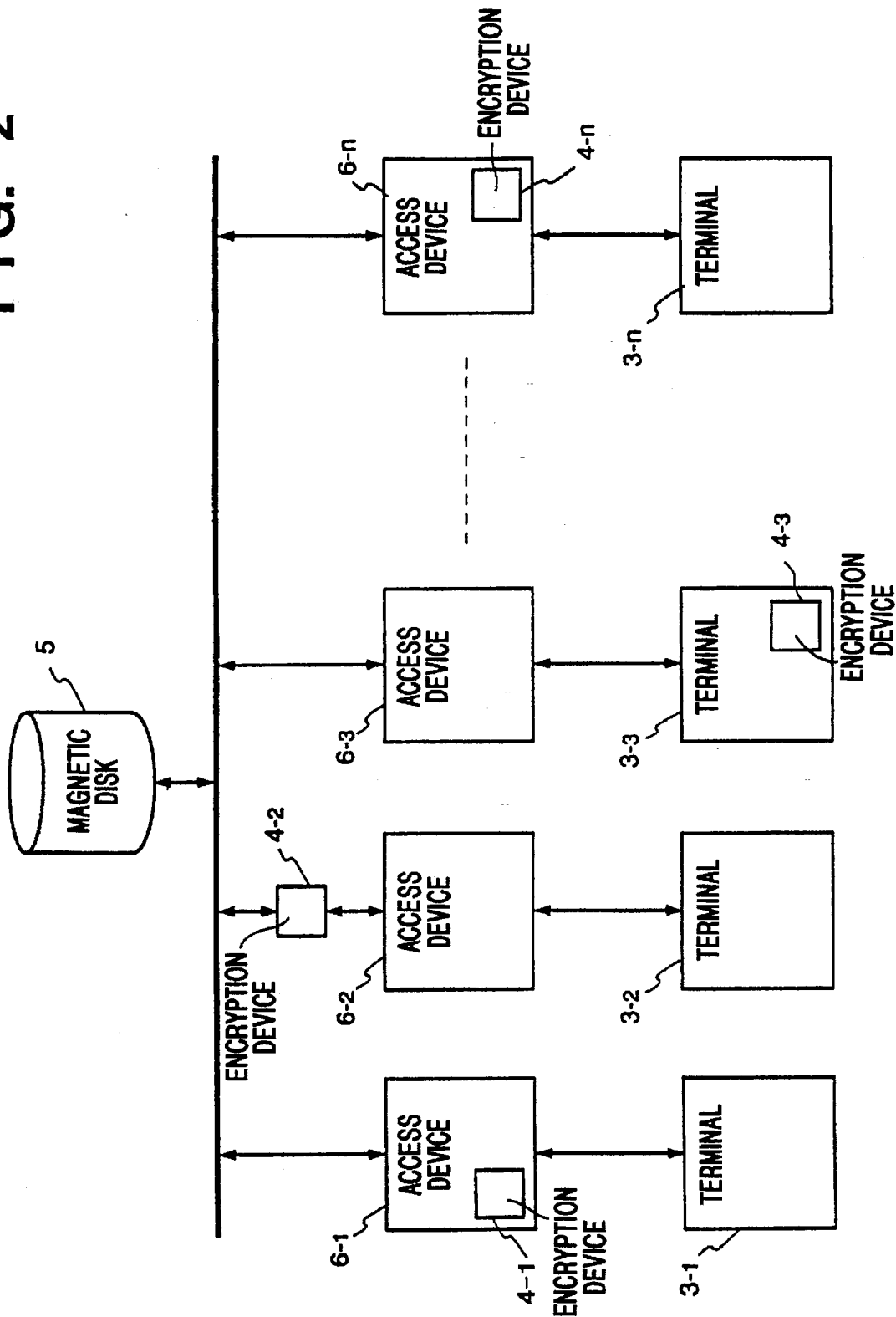
FIG. 2 is a diagram showing the manner in which the encryption system of this embodiment is applied to a memory arrangement.

This encryption system is applicable to communication arrangements other than that shown in FIG. 1. For example, FIG. 2 is a diagram illustrating the manner in which the encryption system of this embodiment is applied to a memory arrangement. Numeral 5 in FIG. 2 denotes a magnetic disk for storing encrypted data transferred from access units $6_{-1} \sim 6_{-1}$. The access units $6_{-1} \sim 6_{-n}$ plant data, which has been encrypted by the respective encryption devices 4, in the magnetic disk 5. Thus, users are capable of utilizing the encryption system individually by means of encryption devices that employ the arithmetic circuits and method of this embodiment in a memory arrangement in the same manner as is done in a communication arrangement.

A description will now be given of a communication method using RSA cryptosystem. Encryption and decryption are respectively represented by the following formulae:

Encryption: $C = M^e \bmod N$

Decryption: $M = C^d \bmod N$ wherein M represents a plain text to be transmitted, C indicates a cryptogram, e indicates an encryption key opened to the public, d indicates a decryption key and N represents a modulus which is opened to public.

Thus, encryption and decryption of an RSA cryptosystem can be executed modular exponentiation circuits which have constructions similar to each other. The following description, therefore, mainly refer to encryption.

The modular multiplication $C = M^e \bmod N$ may be conducted simply by repeating modular multiplication of two numbers. When M and e are large, however, the amount of computation becomes huge. According to the invention, therefore, computation is executed in accordance with the following algorithm. In the algorithm shown below, e is an integer having k bits and is expressed by:

$e = e_k, e_{k-1} \ldots, e_2, e_1.$

Algorithm B
```
INPUPT M, e, N        (input)
C = 1                 (initial set)
For i = k to 1
    If e_i = 1, then C = C · M mod N  (computation 1)
    If i > 1, then C = C · C mod N    (computation 2)
Next
```

In this case, therefore, the modular exponentiation is conducted by repeating modular multiplication $C = C \cdot B \bmod N$ (B is M or C).

Figure 18:
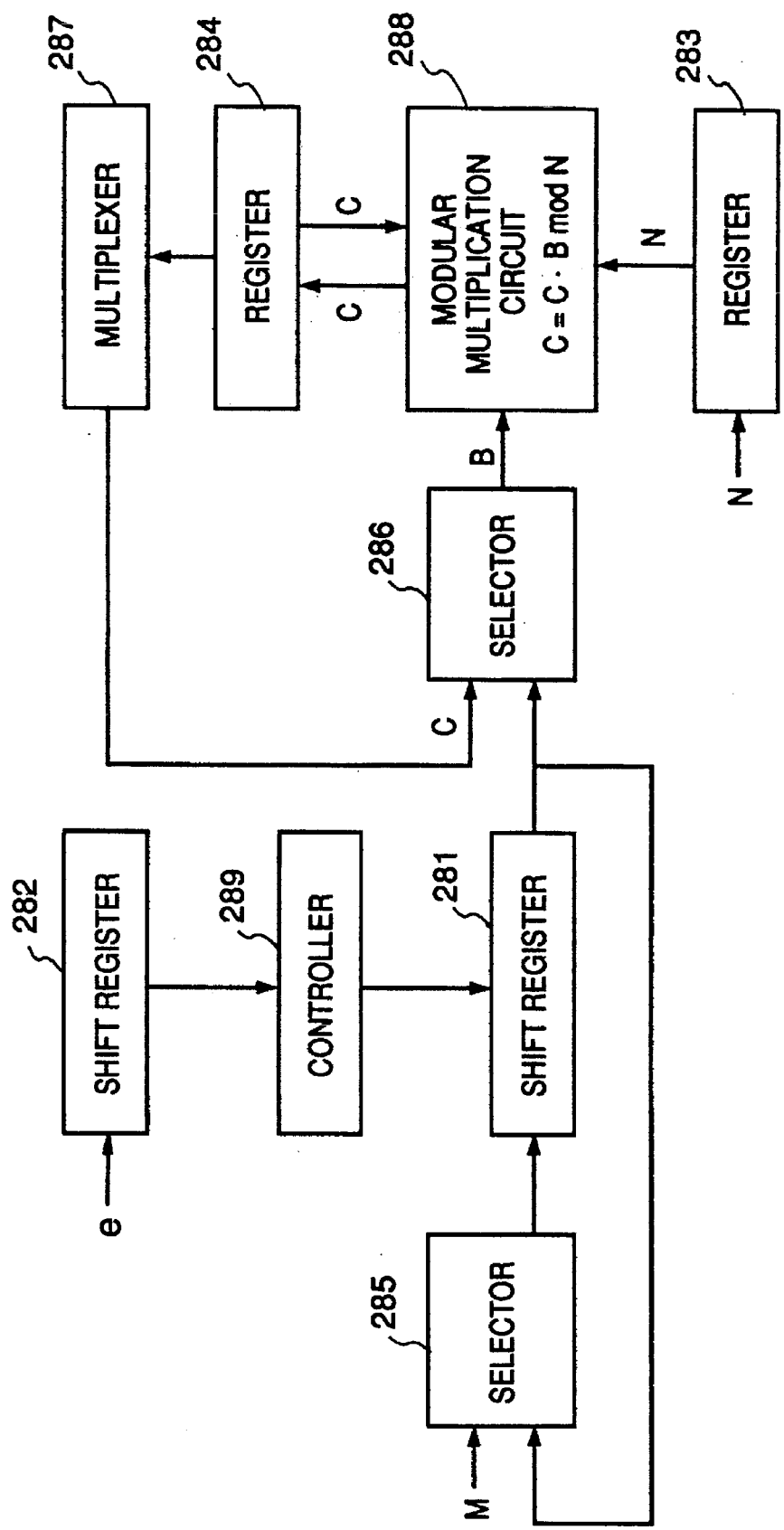
FIG. 18 is a block diagram showing an example of the configuration of an encryption/decryption circuit for RSA cryptosystem.

A circuit capable of efficiently executing the algorithm is shown in FIG. 18. Referring to FIG. 18, reference numerals 281 and 282 represent shift registers for respectively storing the values of M and e. Reference numerals 283 and 284 represent registers for respectively storing the values of N and C. Reference numerals 285 and 286 represent select switches for selecting the inputs and 287 represents a multiplexer for selecting the value of C in the register 284 for each m bits (m is an arbitrary integer) from the upper digits to transmit it in serial form. Reference numeral 288 represents a modular multiplication circuit for executing the calculation $C = C \cdot B \bmod N$. Reference numeral 289 represents a controller for discriminating whether or not $e_i = 1$ or $i > 1$ to control computations 1 and 2 of the Algorithm B or controlling a clear signal or a preset signal for the selector and the register at the time of the receipt of the signal or the initialization. The controller 289 can easily be formed by a counter, a ROM and some logic circuits.

Then, the operation of the circuit shown in FIG. 18 will now be described.

The circuit receives plain text M, public key e and public modulo N. Therefore, M, e and N are in serial or parallel form supplied to the register 283. At this time, the selector 285 selects M to supply M to the register 281. Simultaneously, initialization is performed in such a manner that C=1 by the clear signal or the preset signal for the register as an alternative to supplying the value of C to the register 284.

After the input and the initialization has been completed, the modular multiplications in accordance with the calculations 1 and 2 are commenced. The difference between the computation 1 and the computation 2 lies in the fact that B is M or C in the modular multiplication C=C·B mod N. Therefore, in a case where the computation 1 is executed, the selector 286 selects serial output M for each m bits from the register 281. In a case where the computation 2 is executed, the selector 286 selects serial output C for each m bits from the multiplexer 287. The serial output M for each m bits from the shift register 281 is again supplied to the shift register 281 via the selector 285. The modular multiplication circuit 288 are constituted and operated as described above. The output C from the modular multiplication circuit 288 is, in parallel, supplied to the register 284 so as to be used in the next residue multiplication, so that the computations 1 and 2 are efficiently repeated. If the apparatus is arranged to receive C and d in place of M and e, a cryptogram can be decrypted.

Input values and parameters are decided based upon the following condition in order to equalize the ranges of the input and output values in Equation (A-2) cited above. The condition is:

"The range of P obtained from Equation (A-2) satisfies the relation 0<P<2N, where input values A and B satisfy the relations 0<A and B<2N, respectively, and parameters N and R satisfy the relations 0<N<$2^n$ and R=$2^{n+2}$ (where n is any integer), respectively."

The above-mentioned condition is validated as follows:

"If R=$2^{n+2}$ holds, M<$2^{n+2}$ is established from Equation (A-3). Since N<$2^n$ holds, we have 2N+M/2<R. Accordingly, on the basis of 0≦A, B<2, we have $$P=(A\cdot B+M\cdot N)/R<(2N+M/2)\cdot 2N/R<2N.$$

Since 0≦P holds from Equations (A-2), (A-3), we have 0≦P<2N."

Thus, if the conditions 0<N<$2^n$, 0≦A, B<2N, R=$2^{n+2}$ (where n is any integer) are satisfied, the, P outputted by the Montgomery method can be made to satisfy the relation 0≦P<2N, which is in a range which is the same as that of the input values A, B. Accordingly, a result P of modular multiplication, which falls within the range of the input values can be obtained at all time by executing modular multiplication based upon the Montgomery method using a circuit for setting the integers N, A, B, R which satisfy the above-mentioned conditions, and a circuit for operating on the integers N, A, B, R which satisfy the above-mentioned conditions.

Figure 3:
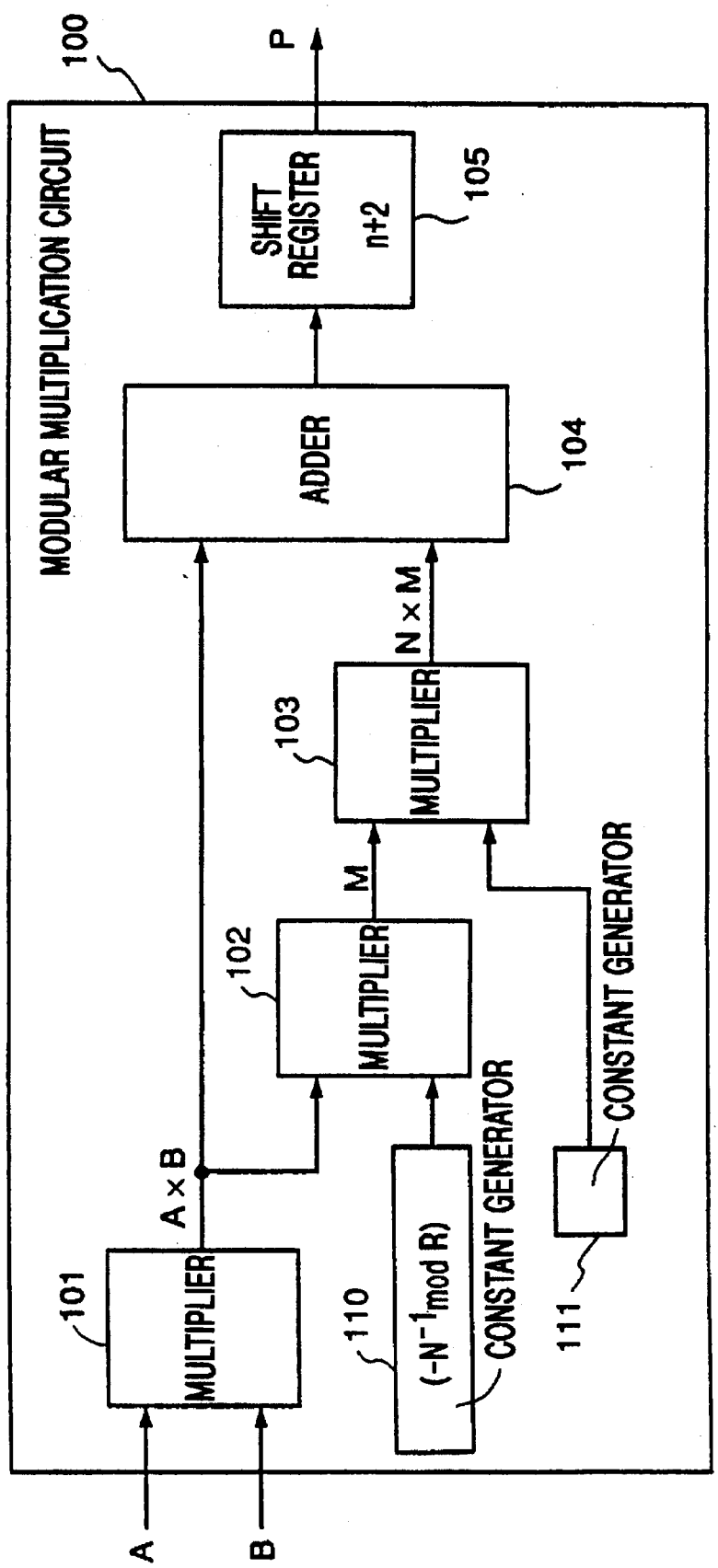
FIG. 3 is a block diagram showing an example of the configuration of a modular multiplication circuit according to a first embodiment.

FIG. 3 is a block diagram showing an example of the configuration of a modular multiplication circuit according to the first embodiment. Numeral 100 denotes the modular multiplication circuit, which includes a multiplier 101 for executing multiplication between input values A and B. The input values A, B, which are produced by the terminal 3, are items of data to be encrypted and transferred to the communication network 1 or a magnetic disk 5.

A multiplier 102 executes multiplication between the output (A×B) of multiplier 101 and N'=(−$N^{-1}$ mod R), which is decided by the set parameters N and R, and outputs lower n+2 bits of the product as A×B×N' mod R (output M). A multiplier 103 executes multiplication between this output M and the set parameter N and then outputs the product (M×N). An adder 104 adds the output (A×B) of multiplier 1 and the output (M×N) of multiplier 103. A shift register 105 executes the operation $\frac{1}{2}^{n+2}$ by shifting the output data from adder 104 leftward by n+2 bits. The shift register 105 produces the output P=[(A×B)+(M×N)]/$2^{n+2}$. Numerals 110, 111 denote constant generating circuits for respectively outputting the constants −$N^{-1}$ mod R and N.

The modular multiplication circuit 100 is realized by the simple circuit construction described above. Furthermore, the output value P falls within the range of the input values A and B at all time owing to the fact that the input values A, B and parameters R, N are decided in accordance with the above-mentioned conditions. Accordingly, even if the encryption device 4 uses cryptography that requires modular multiplication to be executed a plurality of times, it is possible to apply the modular multiplication circuit 100 to the encryption device 4. As a result, an encryption system in which modular multiplication can be utilized efficiently is constructed.

<Second Embodiment>

In the modular multiplication circuit according to the first embodiment, the output value P falls within the range of the input values A and B at all times in modular multiplication using the Montgomery method. In the second embodiment, modular multiplication represented by Q=A·B mod N, which is often used in encryption, executed by the modular multiplication circuit 288 in FIG. 18 for example, is implemented using the above-mentioned modular multiplication circuit.

In order to obtain the above-mentioned output Q using the Montgomery method, it is required that the following two equations be executed continuously:

$$P=A\cdot B\cdot R^{-1} \bmod N=(A\cdot B+M1\cdot N)/R \quad (A-4)$$

$$Q=P\cdot R_R\cdot R^{-1} \bmod N=(P\cdot R_R+M2\cdot N)/R \quad (A-5)$$

where

M1=A·B·N' mod R
M2=P·$R_R$·N' mod R
$R_R$=$R^2$ mod N.

In this case, the output P indicated by Equation (A-4) satisfies the relation 0≦P<2N on the basis of the first embodiment, and 0≦$R_R$<N<2N by definition. Accordingly, each parameter of Equation (A-5) also satisfies the conditions of the first embodiment, and therefore modular multiplication Q can be performed by a modular multiplication circuit whose construction is identical with that of the first embodiment, which implements the Montgomery method, on the basis of the output value P and set value $R_R$.

Figure 4:
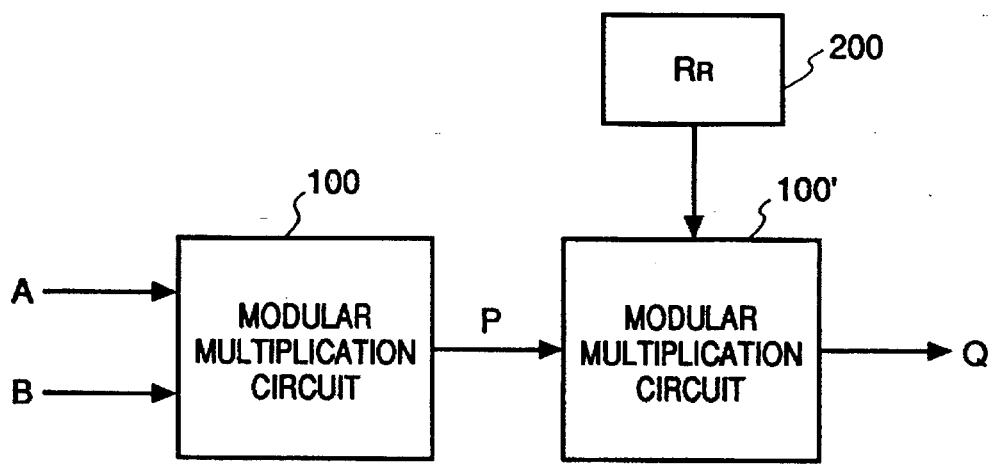
FIG. 4 is a diagram showing an example of the configuration of a modular multiplication circuit for obtaining an output value Q in a second embodiment.

FIG. 4 is a diagram showing an example of the configuration of a modular multiplication circuit for obtaining the output Q in the second embodiment. Here the output value Q is obtained by an arrangement in which two of the above-mentioned modular multiplication circuits 100 are serially connected as shown. To facilitate the description, thereof the second stage of the modular multiplication circuit is designated by reference numeral 100'. Numeral 200 denotes a constant generator for generating RR obtained from the parameters N and R. The output $R_R$ is fed into the modular multiplication circuit 100'. When the output P of the modular multiplication circuit 100, which is obtained by the inputs A and B, and the output $R_R$ of the constant generator 200 are inputted to the modular multiplication circuit 100', M2 is obtained from the multiplier 102 and the output Q represented by Equation (A-5) is obtained.

According to the second embodiment, two of the modular multiplication circuits 100 are used to obtain the output Q. However, the invention is not limited to this embodiment. For example, an arrangement is possible in which reliance is placed upon one modular multiplication circuit 100 by using a selector 301 and a selector 302, as shown in FIG. 5.

Figure 5:
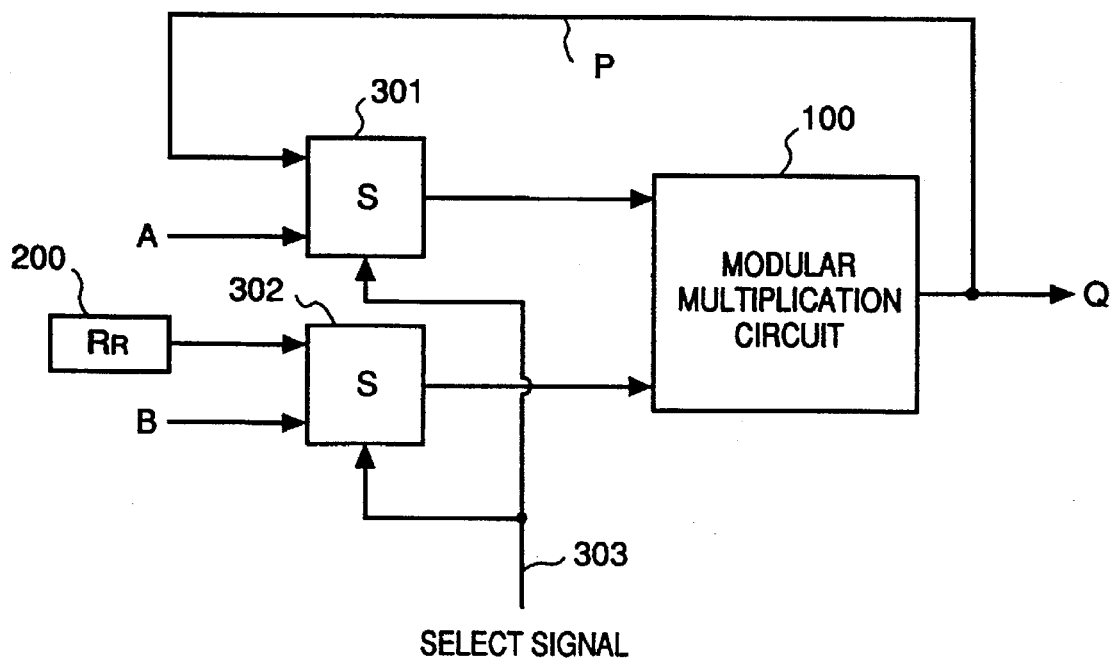
FIG. 5 is a block diagram showing the configuration of a modification of the second embodiment.

FIG. 5 is a block diagram showing the configuration of a modification of the second embodiment. The selector 301 selects either the input value A or the output value (P) of the modular multiplication circuit 100, latches the selected value and outputs it to the modular multiplication circuit 100. The selector 302 selects either the input value B or the output value ($R_R$) of the constant generator 200, latches the selected value and outputs it to the modular multiplication circuit 100. A select signal 303, which is generated by a CPU or other suitable circuit (not shown), is a signal which changes over the selectors 301, 302. The select signal 303 causes the selectors 301, 302 to select and latch the respective input values A, B at the timing at which the input values A, B are accepted. Accordingly, the modular multiplication circuit 100 produces the output value P. Next, in response to the select signal 303, the selectors 301, 302 select and latch the output value P and constant $R_R$, respectively. As a result, the inputs to the modular multiplication circuit 100 at this time are the output value P and the constant $R_R$, and therefore the output value, Q is obtained from the modular multiplication circuit 100.

By using the above-described modular multiplication circuit in the encryption system shown in FIG. 1, it is possible to construct an encryption system capable of executing modular multiplication efficiently.

Thus, in accordance with each of the foregoing embodiments, modular multiplication can be executed while making the ranges of the input and output values of the Montgomery method the same. As a result, it is possible to execute efficiently an operation based upon repetition of the Montgomery method, and various encryption systems using modular multiplication that utilizes the Montgomery method can be constructed efficiently. Further, since Equations (A-2)~(A-5) are indicative of integral operations, the arithmetic circuitry and techniques for realizing modular multiplication are not limited to those of the foregoing embodiment. For example, it is obvious that this can be realized by carrying out the arithmetic operations by software using a CPU or the like.

Thus, in accordance with the embodiments as described above, modular multiplication represented by $P=A \cdot B \cdot R^{-1}$ mod N can be executed, without changing the ranges of the input and output values, by using the Montgomery method. Accordingly, there is obtained an encryption device in which encryption using modular multiplication is performed efficiently.

Furthermore, modular multiplication represented by $Q=A \cdot B$ and N can be executed efficiently by the Montgomery method, and there is obtained an encryption device in which encryption using modular multiplication is performed efficiently.

<Third Embodiment>

A method of generating pseudorandom numbers according to a third embodiment makes it possible to eliminate the operation of Equation (B-13) by using $\alpha_i$, which is obtained directly by $$\alpha_i = lsb(y_i) \ (i=0, 1, 2, \ldots) \quad \text{(B-17)}$$

from $y_i$ of Equation (B-12), as a cryptologically secure Sequence of pseudorandom numbers. The method raises the speed at which pseudorandom numbers are generated without detracting from the security of the outputted random numbers.

The security of pseudorandom number generation using Equation (B-1) utilizes the fact that it is very difficult to obtain $b_i$ from $X_{i+1}$, namely the fact that $b_i$ is a hard core bit of $X_{i+1}$. A case in which pseudorandom numbers are generated using Equations (B-11), (B-17) also is such that it is very difficult to obtain $\alpha_i$ from $y_{i+1}$, which is the result of multiplying $X_{i+1}$ by a certain constant R. In other words, since $\alpha_i$ is a hard core bit of $y_{i+1}$, the security of pseudorandom number generation using Equations (B-11) and (B-17) also is the same as that of pseudorandom number generation using Equation (B-1).

In accordance with this embodiment, as described above, it is possible to generate a sequence of pseudorandom numbers having the same degree of security as that of Equation (B-1) at higher speed or with circuitry of a smaller scale without executing the processing of Equation (B-13). Generation/reproduction of communication data can be performed at high speed using the method of this embodiment.

The fact that the security of pseudorandom number generation using equations (B-11) and (B-17) is the same as that of pseudorandom number generation using Equation (B-1) will be proven. First, however, the symbols used will be simply defined. For the details, see "Modern Cryptographic Theory" [by Shinichi Ikeno and Kenji Koyama, published in 1986, *Denshi Joho Tsushin Gakkai*, pp. 14~15, 95~96)

•Quadratic residue

When there is a solution to $X^2 \equiv c$ (mod p), c is the quadratic residue of p. When there is no solution, c is the quadratic non-residue.

•Legendre symbol (x/p):

When p is a prime number and $X \neq 0$ (mod p) holds, we have $(x/p) = 1$ :when x is the quadratic
    residue of p
$\phantom{(x/p) =} -1$ :when x is the quadratic
    non-residue of p

•$Z^*_N$:

relatively prime with respect to N; an integer in the range of from 0 to N−1

Jacobi symbol (x/N):

With respect to $x \in Z^*_N$ and $N=p \cdot q$ (where p, q are prime numbers), the Jacobi symbol (x/N) is represented by the following using the Legendre symbol (x/p):

$(x/N)=(x/p)(x/q)$

•$Z^*_N(+1)=\{x \in Z^*_N | (x/N)=1\}$

•$Z^*_N(-1)=\{x \in Z^*_N | (x/N)=1\}$

•$Q_1=\{x \in Z^*_N | (x/p)=(x/q)=1\}$

•$Q_2=\{x \in Z^*_N | (x/p)=(x/q)=-1\}$

•$Q_3=\{x \in Z^*_N | (x/p)=-(x/q)=1\}$

•$Q_4=\{x \in Z^*_N | (x/p)=-(x/q)=-1\}$.

Illustrating that the security of pseudorandom number generation using Equations (B-11) and (B-17) is the same as the security of pseudorandom number generation using Equation (B-1) is equivalent to proving the following proposition:

[Proposition]

"If $\alpha_i$ can be inferred correctly from the pseudorandom number sequence $\alpha_{i+1}, \alpha_{i+2}, \ldots$ generated from Equations (B-11), (B-17), the quadratic residue thereof can be judged with respect to any $c[c \in Z^*_N(+1)]$."

[Proof]

When $r \in Q_1$ holds, the following hold with respect to any $c \ [c \in Z^*_N(+1)]$:

$$b = R \cdot c \bmod N$$

$$y_{i+1} = R^{-1} \cdot b^2 \bmod N$$

and $\alpha_{i+1}, \alpha_{i+2}, \ldots$ are generated by Equations (B-11), (B-17), with $y_{i+1}$ serving as an initial value.
At this time we have $$b \in Z^*_N(+1)$$

$$y_{i+1} \in Q_1$$

At this time, if we let the solution to $$y_{i+1} = R^{-1} \cdot z^2 \bmod N$$

$$y_{i+1} \cdot R = z^2 \bmod N$$

be $Z_j$ (j=1, 2, 3, 4) (where $Z_j \in Q_j$), then $$\alpha_j = lsb(z_1)$$

can be predicted from $$Z_1 \equiv -Z_2 \ (\bmod \ N)$$

$$Z_3 \equiv -Z_4 \ (\bmod \ N)$$

by assumption. Accordingly, if $\alpha_1 = lsb(b)$ holds, then $b \in Q_1$, at which time $c \in Q_1$ holds;

if $\alpha_1 \neq lsb(b)$ holds, then $b \in Q_2$, at which time $c \in Q_2$ holds.
Similarly, the quadratic residue property of c can be judged also when $R \in Q_2$, $R \in Q_3$, $R \in Q_4$ hold.

Q.E.D.

Figure 6:
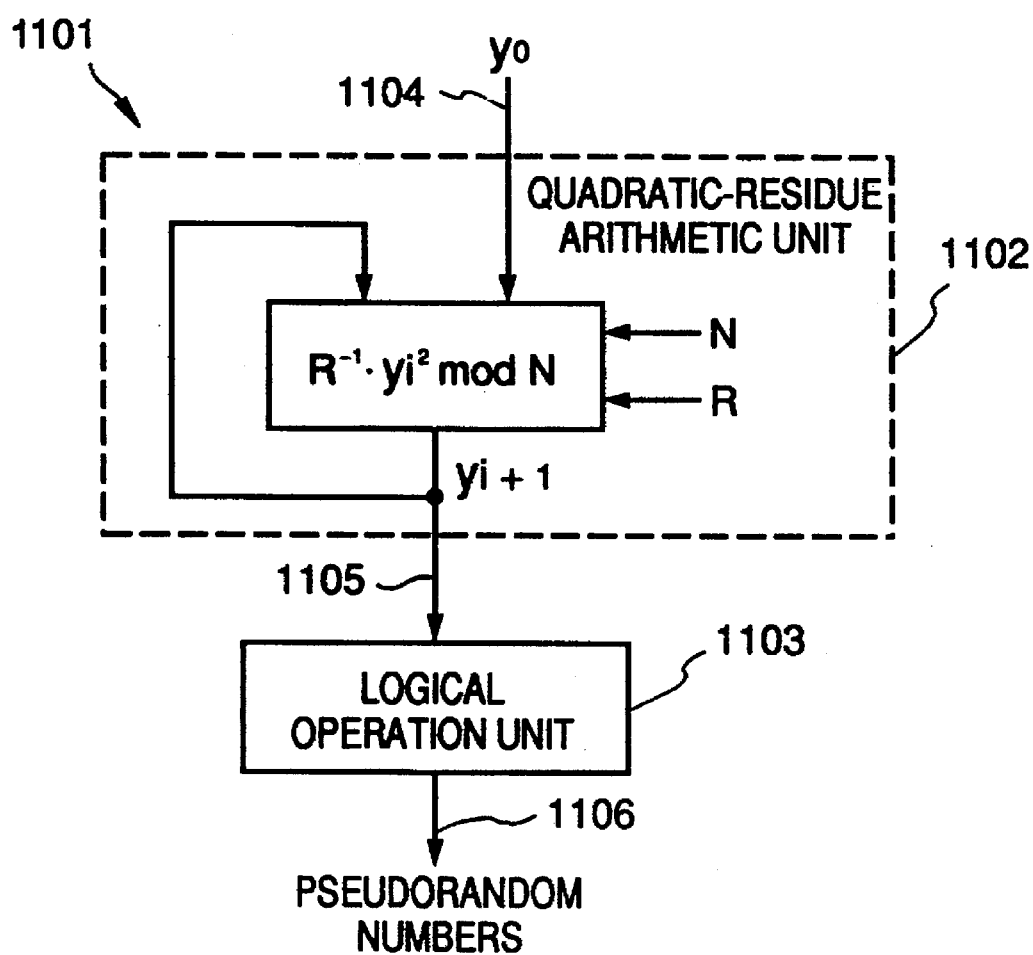
FIG. 6 is a diagram showing the configuration of a pseudorandom number generator according to a third embodiment.

FIG. 6 is a diagram showing the configuration of a pseudorandom number generator 1101 according to this embodiment. The pseudorandom number generator 1101 comprises a quadratic-residue arithmetic unit 1102 and a logical operation unit 1103.

The quadratic-residue arithmetic unit 1102 performs the operations, which are indicated by the following equations, in the form of a chain to generate $y_1, y_2$ from the initial value $y_0$, N, which is the modulus of modular multiplication, and an arbitrary constant R, which is a relatively prime number with respect to N:

$$y_{i+1} = R^{-1} \cdot y_i^2 \bmod N \ (i=0, 1, 2, \ldots) \quad (B-18)$$

$$N = p \cdot q \quad (B-19)$$

where p, q are prime numbers of $p \equiv q \equiv 3 \ (\bmod \ 4)$.

Further, R is an arbitrary number which is relatively prime with respect to N.

The $y_1, y_2, \ldots y_{i+1}$ generated are outputted sequentially on output line 1105.

The operational method represented by the foregoing equations is referred to as the Montgomery method, as mentioned earlier. According to the Montgomery method, the operations indicated by the following equations are actually performed in order to obtain the computational result $y_{i+1}$.

$$y_{i+1} = (y_i^2 + M \cdot N)/R \ (i=0, 1, 2, \ldots) \quad (B-20)$$

where $$M = y_i^2 \cdot N' \bmod R \quad (B-21)$$

$$N' = -N^{-1} \bmod R \quad (B-22)$$

Since N is an odd number, R and N are relatively prime integers if $R = 2^t$ holds (where t is an arbitrary integer). In this case, division by R and a residual operation do not necessitate actual operations and $y_{i+1}$ can be computed at high speed by multiplication and addition.

In a case where the quadratic-residue arithmetic unit 1102 is constructed of hardware, for example, the operation based upon the Montgomery method can readily be executed by providing an adder, a multiplier and a basic arithmetic unit such as a shifter which performs a bit shift for division by R and a residual operation. Furthermore, use can be made of a Montgomery arithmetic circuit illustrated in the literature "Exponential Algorithm and Systolic Array Using the Montgomery Method" (Iwamura, Matsumoto, Imai; vol. 92, No. 134, pp. 49–54, 1992).

The values of $y_1, y_2, \ldots$ outputted sequentially on output line 1105 of the quadratic-residue arithmetic unit 1102 enter the logical-operation unit 1103. The latter extracts an arbitrary bit (or bits) in a range of lower-order $\log_2 n$ (where n represents the number of digits of N in binary notation) bits of each of the entered $y_1, y_2$ and outputs these bits as a pseudorandom number on output line 1106. For example, all of the lower-order $\log_2 n$ bits may be outputted as a pseudorandom number or only the least significant bit may be outputted as a pseudorandom number.

In a case where the logical operation unit 1103 is constituted by hardware, use can be made of a parallel-input, serial-output shift register which latches the entered $y_i$ (i=1, 2, ...) in parallel and outputs, in serial form, the lower-order $\log_2 n$ bits.

A case will now be described in which the above-described method of generating pseudorandom numbers is realized by software.

Figure 7:
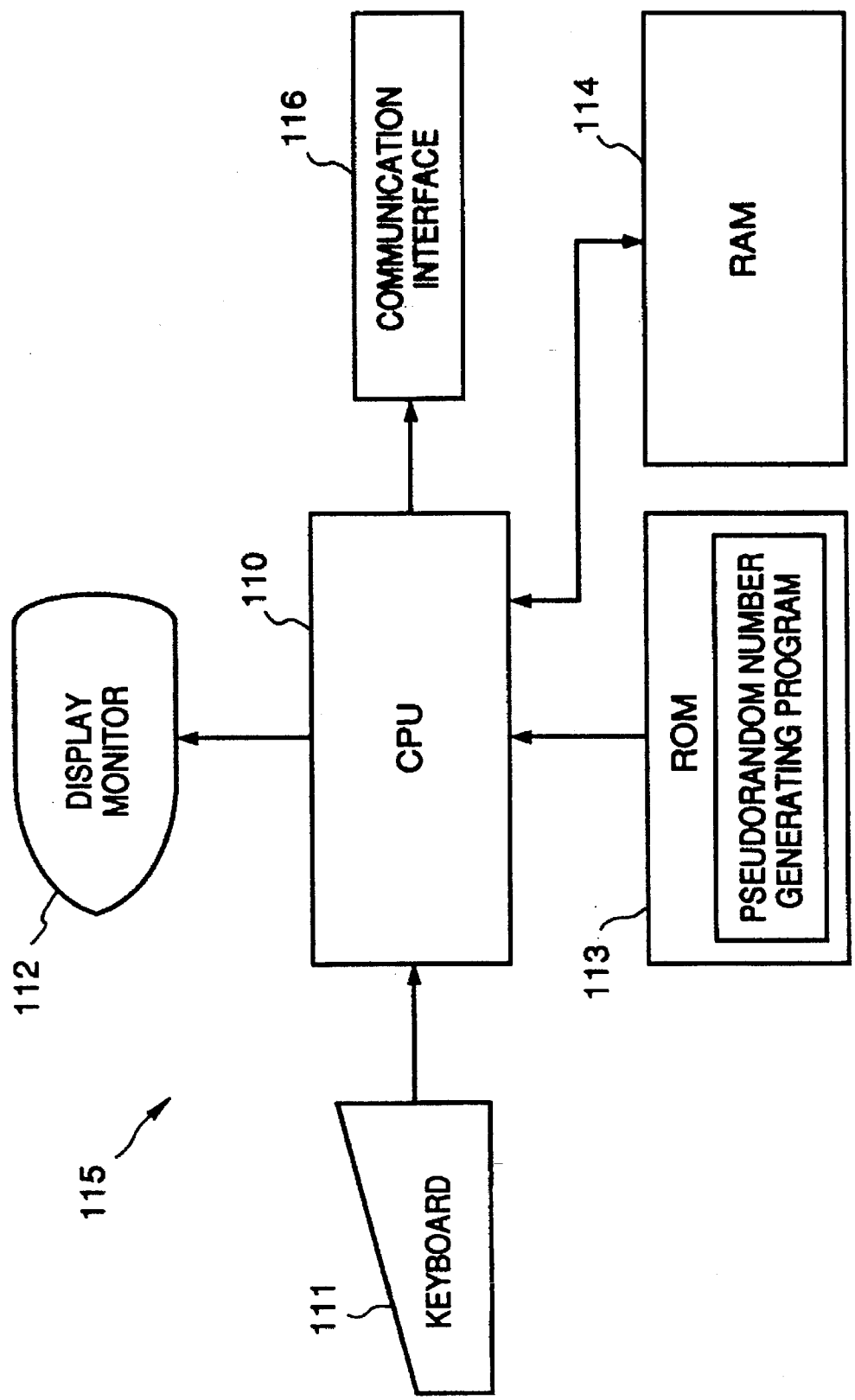
FIG. 7 is a diagram showing a data processor which executes processing for generating pseudorandom numbers according to the invention.

FIG. 7 is a diagram showing the configuration of a data processor 115 in which a program for generating pseudorandom numbers has been loaded in order to realize the pseudorandom number generating method of the third embodiment by means of software. Here a CPU 110 controls the overall data processor 115 in which a program for generating pseudorandom numbers has been loaded. A keyboard 111 is for entering a command which starts the pseudorandom number generating program as well as the values of various parameters for the pseudorandom number generating program. The pseudorandom number generating program according to this embodiment is stored in a ROM 113 in advance. The program is executed by the CPU 110 while the it is being read out. A RAM 114 is a working area used to execute the pseudorandom number generating program and stores the results of generating the pseUdorandom numbers. A communication interface 116 encrypts an input text by using the pseudorandom numbers stored in the RAM 114 and outputs the encrypted text on a communication line.

Figure 8:
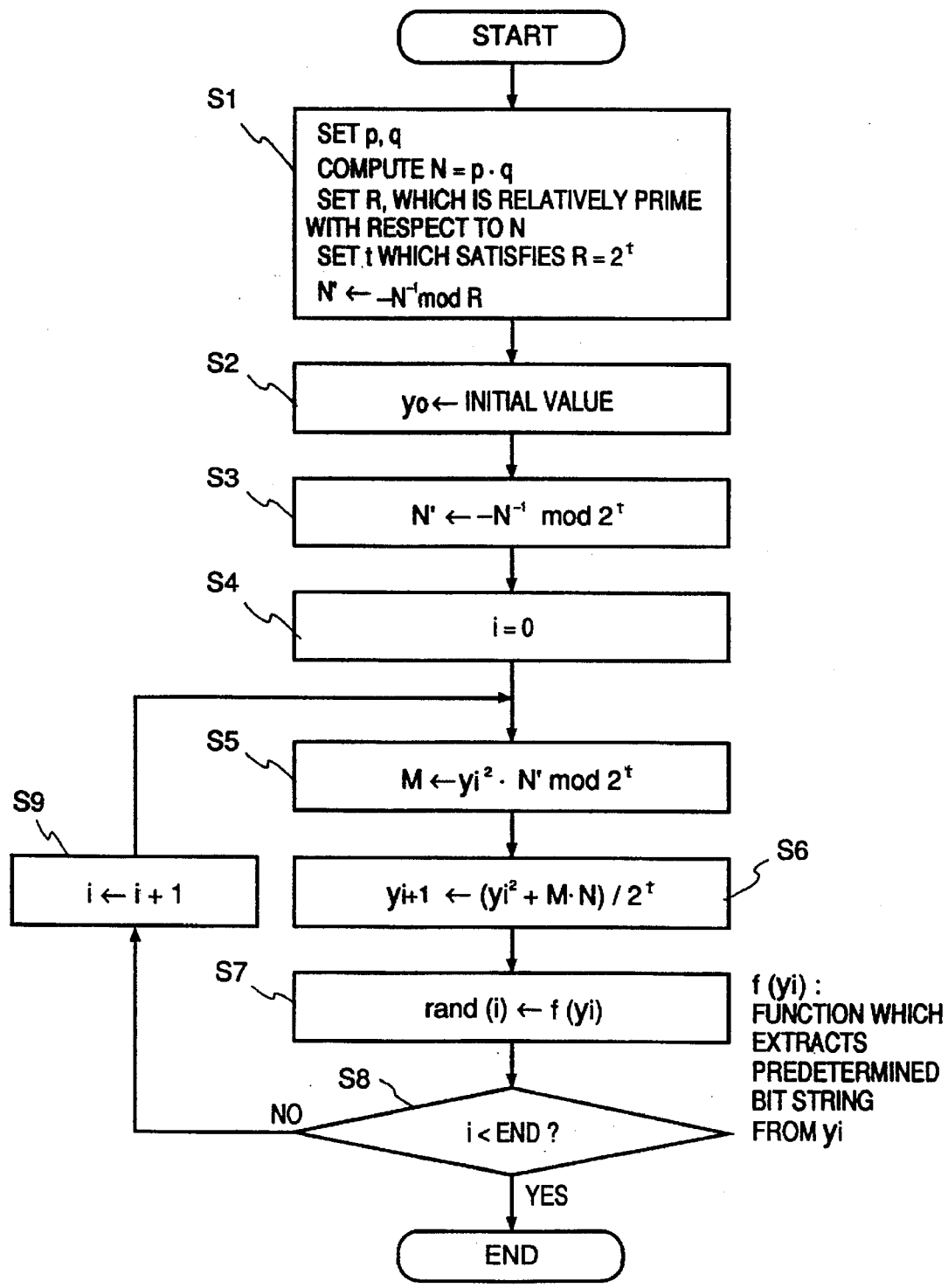
FIG. 8 is a flowchart of a program for generating pseudorandom numbers according to the third embodiment.

FIG. 8 is a flowchart for describing the processing of the pseudorandom number generating program. This processing will now be described with reference to the flowchart. The basis of the pseudorandom number generating program is the execution of the operations of Equations (B-7)–(B-9).

At step S1, prime numbers which are 3 (mod 4) are selected arbitrarily and set as p, q. The operation $p \cdot q$ is performed and the result is set as N. Arbitrary numbers are set as t and R, which are relatively prime with respect to N and satisfy $R = 2^t$. In addition, "$-N^{-1} \bmod R$" is computed and the result is set as N'.

An arbitrary initial value for generating random numbers is set as $y_0$ at step S2.

The operation $-N^{-1} \bmod 2^t$ is performed at step S3 and the result is set as N'.

Next, i, which indicates the number of repetitions of random number generation, is initialized to "0" at step S4.

This is followed by step S5, at which "$y_i^2 \cdot N'$ mod $2^{t}$" is computed and the result set as M. Although here the processing for dividing "$y_i^2 \cdot N'$" by $2^t$ is fundamental, the division can be executed at high speed since it will suffice if "$y_i^2 \cdot N'$" is processed by a "t" bit shift.

Next, at step S6, the operation "$(y_i^2 + M \cdot N)/2^{t}$" is performed and the result is set as $y_{i+1}$. This division also can be processed at high speed since the "t" bit shift is fundamental.

Next, at step S7, a series of bits of a prescribed number at prescribed positions is extracted from $y_i$ and set as rand(i). It should be noted that rand(i) is a one-dimensional array.

The value of i is compared with a prescribed End value at step S8 and the program proceeds to step S9 if the value of i is less than the End value. It should be noted that the End value is has been set to correspond to the quantity of sequences of random numbers desired to be generated. This may be set from the keyboard 111 or by a separate program which calls the pseudorandom number generating program.

This is followed by step S9, at which i is counted up in order to generate the next random number. Processing from step S5 onward is then executed again to continue the generation of subsequent random numbers.

By executing the above-described processing, a series of pseudorandom number sequences is generated in the array area rand.

Figure 9:
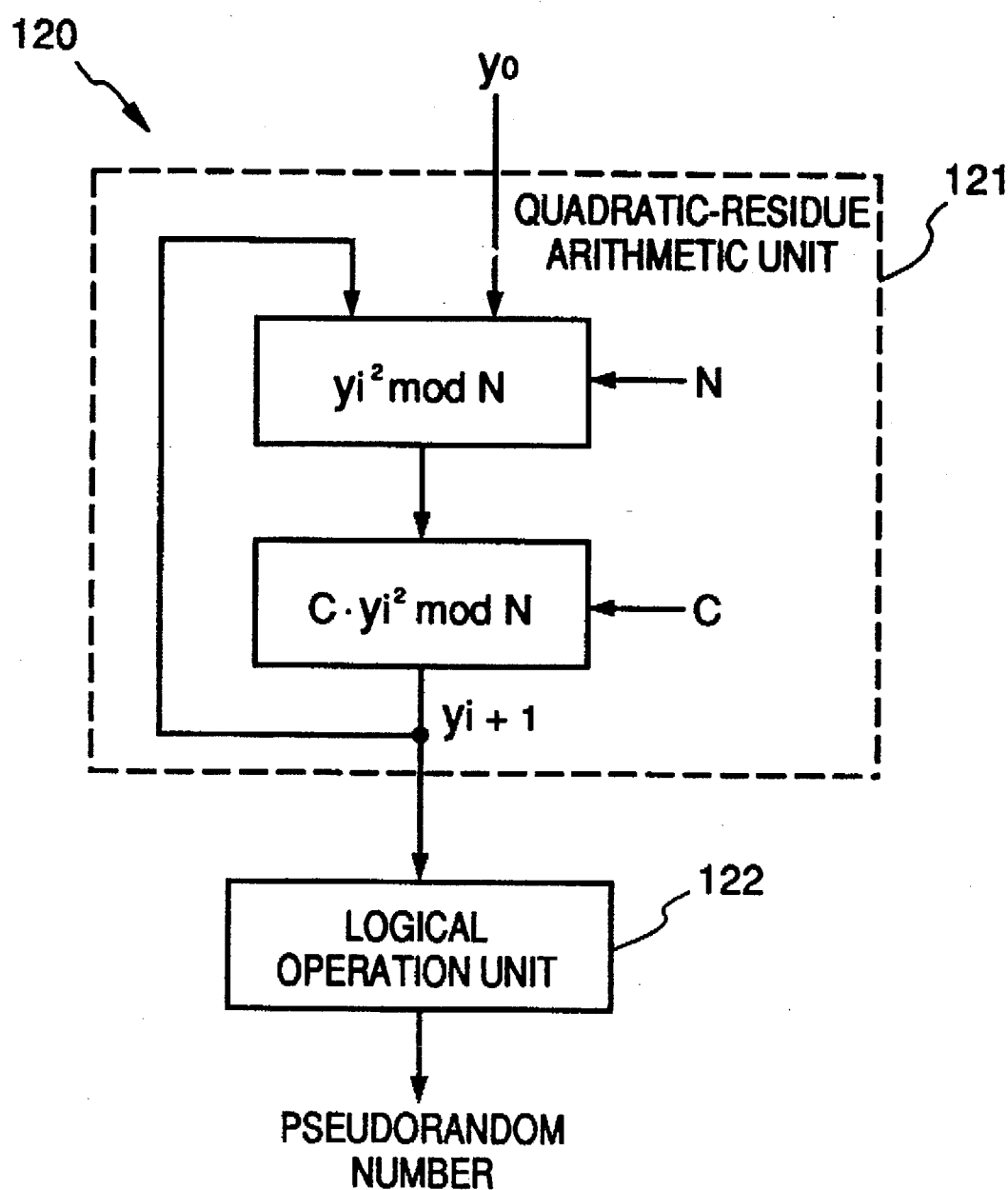
FIG. 9 is a diagram showing an example of a method of generating pseudorandom numbers according to a method other than the Montgomery method.

The foregoing illustrates a method of generating pseudorandom numbers by the Montgomery method. In general, however, a modular multiplication can be performed with respect to a number $C \cdot X^2$ obtained by multiplying the result $X^2$ of a quadratic operation by an arbitrary constant C, and pseudorandom numbers can be generated from a prescribed number of bits of $y = C \cdot X^2$ mod N obtained as a result. FIG. 9 is a diagram showing the configuration of a pseudorandom number generator 120 according to a modification of the third embodiment. The pseudorandom number generator 120 comprises a quadratic-residue arithmetic unit 121 and a logical operation unit 122.

The quadratic-residue arithmetic unit 121 performs the operations, which are indicated by the following equations, in the form of a chain to generate $y_1, y_2$ from the initial value $y_0$ and the arbitrary constant C:

$$y_{i+1} = C \cdot y_i^2 \bmod N \ (i=0, 1, 2, \ldots)$$

$$N = p \cdot q$$

where p, q are prime numbers of $p \equiv q \equiv 3$ (mod 4).

Since the operations indicated in the quadratic-residue arithmetic unit 121, namely $$y_i^2 \bmod N$$

$$C \cdot y_i^2 \bmod N$$

are both modular multiplication operations, it will suffice if the quadratic-residue arithmetic unit 121 is arranged to perform modular multiplication operations. In a case where the unit is constituted by hardware, it is also possible to use a modular multiplication arithmetic circuit illustrated in the literature "Method of Constructing RSA Encryption Device by Parallel Processing" (Iwamura, Matsumoto, Imai; *Denshi Joho Tsushin Gakkai Ronbun* A, vol. J75-A, No. 8, pp. 1301~1311, 1992). The output of the quadratic-residue arithmetic unit 121 enters the logical operation unit 122. The latter generates and outputs a sequence of random numbers from an arbitrary bit (or bits) in a range of lower-order $\log_2 n$ (where n represents the number of digits of N in binary notation) bits of each of the entered $y_1, y_2 \ldots$.

The logical operation unit 122 is capable of outputting, as a pseudorandom number, arbitrary bits in a range of lower-order $\log_2 n$ bits of each of the entered $y_1, y_2, \ldots$. For example, all of the lower-order $\log_2 n$ bits may be outputted as a pseudorandom number or only the least significant bit may be outputted as a pseudorandom number.

In accordance with the third embodiment, as described in detail above, in a case where cryptologically secure pseudorandom numbers are generated by the Montgomery method, prescribed bits of $y_i$ obtained by Equation (B-11) are used as a pseudorandom number, thereby making it possible to dispense with the operation of Equation (B-13), which is necessary in the prior art, without detracting from security. By adopting this arrangement, a sequence of pseudorandom numbers having the same degree of security as that of the prior art can be generated at a high speed or by circuitry of a smaller scale.

Thus, as described above, generation/reproduction of communication data can be performed at a high speed using the pseudorandom numbers generated by the method and apparatus of this embodiment.

<Fourth Embodiment>

The purpose of the pseudorandom number generator according to the fourth embodiment is to eliminate the operation indicated by equation (*3) of the above-described Algorithm 2, thereby making it possible to generate a sequence of a pseudorandom numbers at a higher speed or by circuitry of a smaller scale while maintaining a degree of security the same as that of Equation (B-3).

First, the following is an Algorithm 3 for a case in which the operation of equation (*3) of Algorithm 2 has been eliminated:

[Algorithm 3]
INPUT $x_0$, e, N, s, $R_R = R^2$ mod N
$y_0$ = Mont ($x_0$, $R_R$)
FOR i = 0 TO s
  $y_{i+1}$ = Mont (1, $R_R$)
  FOR j = k TO 1
    IF $e_j$ = 1 THEN $y_{i+1}$ = Mont($y_{i+1}$, $y_i$)
    IF j > 1 THEN $y_{i+1}$ = Mont($y_{i+1}$, $y_{i+1}$)
  NEXT
  OUTPUT $y_{i+1}$ (= $R^{-(e-1)} \cdot y_i^e$ mod N)
NEXT, The series $y_i$ (i=0, 1, 2, ..., s) obtained by executing Algorithm 3 is indicated by Equation (B-15). A pseudorandom number generator according to the fourth embodiment for a case in which equation (*3) of Algorithm 2 has been eliminated uses $\alpha_i$ obtained by $$\alpha_i = lsb(y_i) \ (i=0, 1, 2, \ldots) \tag{B-23}$$

from $y_i$ of Equation (B-15) as a cryptologically secure pseudorandom number.

The security of pseudorandom number generation using Equations (B-15) and (B-23) will be considered. The security of pseudorandom number generation using Equation (B-3) utilizes the fact that it is very difficult to obtain $b_i$ from $x_{i+1}$, namely the fact that $b_i$ is a hard core bit of $x_{i+1}$. The series $y_i$ (i=0, 1, 2, ...) obtained by Equation (B-15) are values obtained by multiplying the series $x_i$ (i=0, 1, 2, ...), which is obtained by Equation (B-3), by the constant R and taking the residue modulo N [see Equation (B-16)]. Accordingly, if it is very difficult to obtain $b_i = lsb (x_i)$ from $x_{i+1}$, then it will also be very difficult to obtain $\alpha_i = lsb (y_i)[lsb(R \cdot x_i \bmod N)]$ from $y_{i+1}$ (=$R \cdot x_{i+1}$ mod N), which is the result of multiplying $x_{i+1}$ by the constant R and taking the residue modulo N. In other words, since $\alpha_i$ is a hard core bit of $y_{i+1}$, the security of pseudorandom numbers generation using Equations (B-15) and (B-23) also is the same as that of pseudorandom number generation using Equation (B-3).

Figure 10:
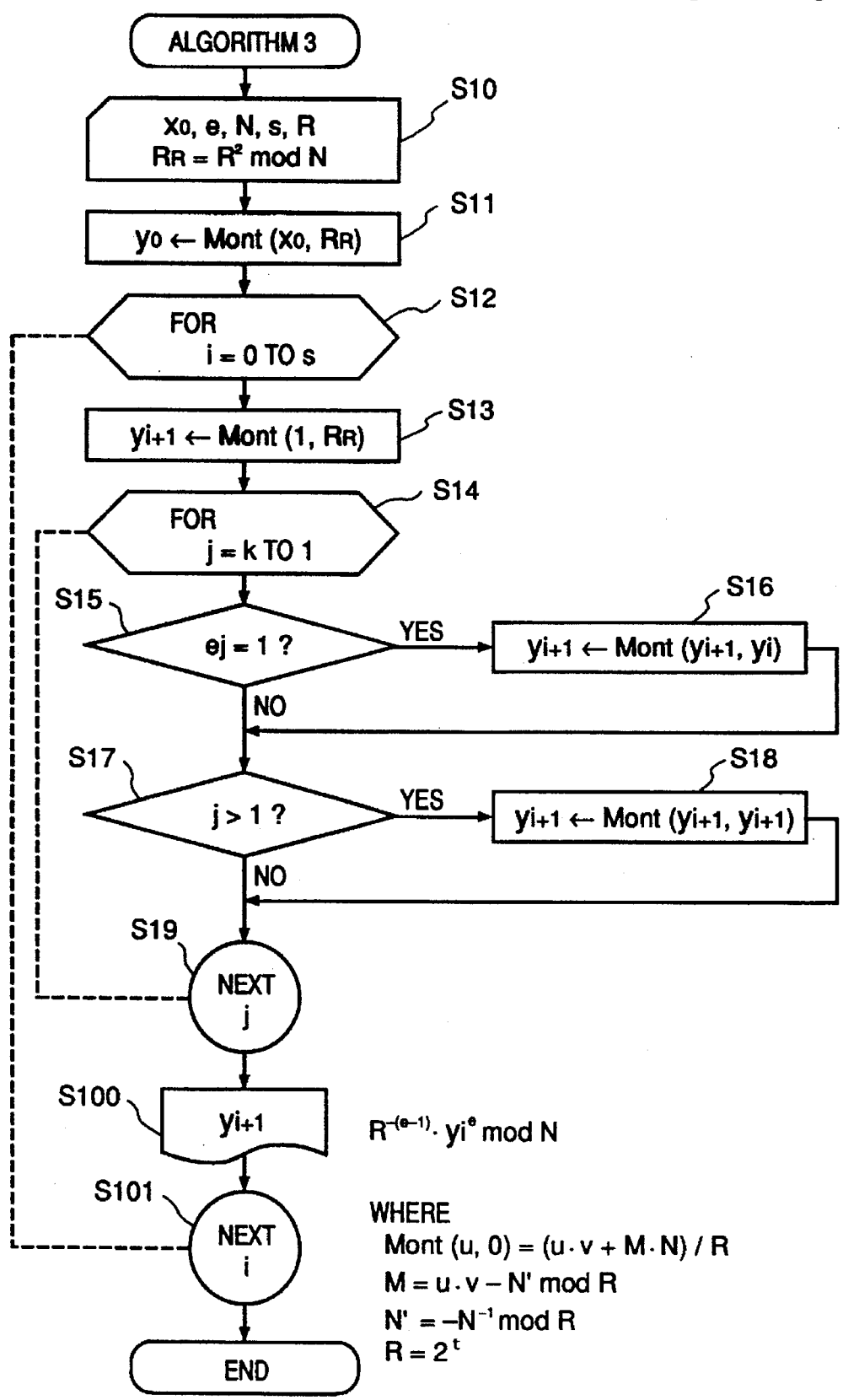
FIG. 10 is a flowchart of a program for generating pseudorandom numbers according to the fourth embodiment.

A processing flowchart for executing Algorithm 3 will now be described with reference to FIG. 10.

Values of $x_0$, e, N, s and R are entered at step S10. Here s is the number of repetitions of the modular multiplication. Further, R satisfies $R=2^t$ (where t is an integer).

The operation Mont $(x_0, R_R)$ is performed at step S11 and the result is set as $y_0$. Here Mont $(x_0, R_R)$ is a function, in which $x_0$, $R_R$ are variables, for performing the operations of Equations (B-7), (B-8) and (B-9). It should be noted that Equation (B-9) can be computed in advance and N' is treated as a constant. In actuality, therefore, the operations of Equations (B-7), (B-8) are performed to obtain Mont $(x_0, R_R)$. In the operations of Equations (B-7), (B-8), modulus R is expressed by $2^t$ beforehand and therefore the required division can be executed by a bit-shift.

A counter i of repetitions of the residual operation first is initialized to "0" at step S12. Whenever this step is entered, the counter i is incremented and processing proceeds to the next step. The count-up operation is performed up to s.

Next, at step S13, the operation Mont $(1, R_R)$ is performed and the result is set as $y_{i+1}$.

This is followed by step S14, at which a bit pointer j for pointing to each bit of e is first set at k. Here k is the bit length of e and is assumed to be set in advance. Whenever this step is entered, a bit pointer j is decremented and processing proceeds to the next step. The countdown proceeds to 1.

At step S15, it is determined whether the j-th bit $e_j$ designated by the bit pointer j is "1" or not. If the bit $e_j$ is "1", the program proceeds to step S16, the operation Mont $(y_{i+1}, y_i)$ is performed and the result is set as $y_{i+1}$. If the bit $e_j$ is "0", the program proceeds to step S17.

It is determined at step S17 whether the bit pointer j is greater than "1" or not. If j is not greater than or equal to "1", then the program proceeds to step S19. If j is greater than "1", the program proceeds to step S18, the operation "Mont $(y_{i+1}, y_{i+1})$" is performed and the result is set as $y_{i+1}$.

Next, at step S19, it is determined whether the bit pointer j is a value in the interval "k~1". If j is a value in this interval, then the program returns to the residual processing from step S14 onward. If j is outside this interval, then the program proceeds to step S100.

At step S100, $y_{i+1}$ (i=0, 1, 2, ... ) is stored in a memory device or the like.

Next, at step S101, it is determined whether the counter i is a value in the interval "0~s". If i is a value in this interval, then the program returns to residual processing from step S12 onward and the next residual processing operation is performed. If i is outside this interval, then residual processing is terminated.

Figure 11:
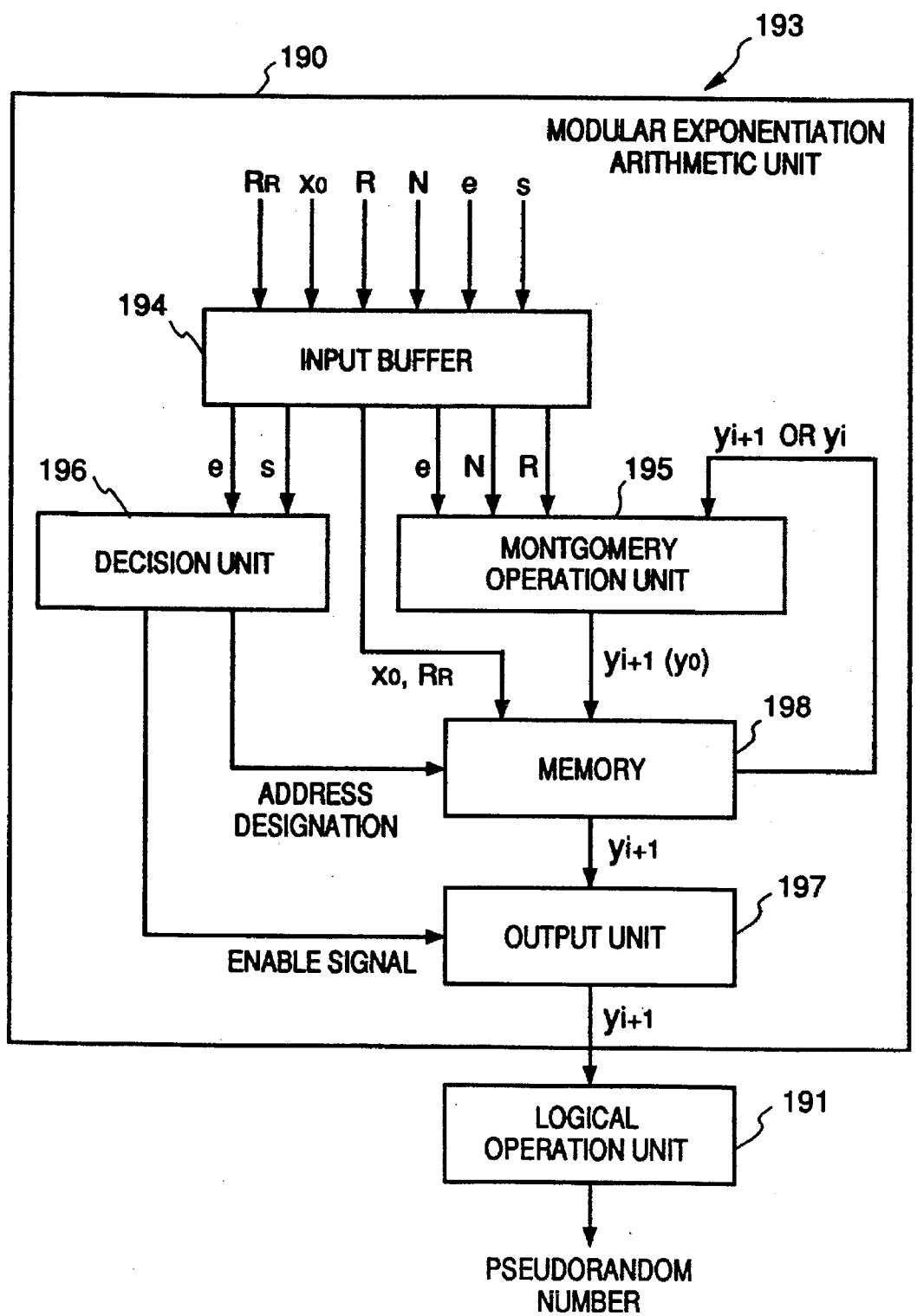
FIG. 11 is a block diagram showing an example of the configuration of a modular multiplication circuit according to the fourth embodiment.

FIG. 11 is a diagram showing the configuration of a pseudorandom number generator 193 according to the fourth embodiment of the present invention. A modular exponentiation arithmetic unit 190 performs the following operation, in the form of a chain, using the initial value $x_0$, N, which is the modulus of the modular exponentiation, the arbitrary constant R, which is a relatively prime number with respect to N, and the power e, and generates $y_1$, $y_2$, ... :

$$y_0 = R \cdot x_0 \bmod N \quad \text{(B-24)}$$

$$y_{i+1} = R^{-(e-1)} \cdot y_i^e \bmod N \ (i=0, 1, 2, \ldots) \quad \text{(B-25)}$$

Here $N=p \cdot q$ holds, where p, q are prime numbers and e ($\geq 2$) is an arbitrary constant.

The modular exponentiation arithmetic unit 190 executes Algorithm 3. The inputs to the modular exponentiation arithmetic unit 190 are the initial value $x_0$, the power e, the modulus N of the arithmetic operation, the constant R, $R_R = R^2 \bmod N$, and the number of repetitions s with regard to i. The modular exponentiation arithmetic unit 190 which successively outputs $y_{i+1}$ (i=0, 1, ..., s), comprises an input buffer 194, a decision unit 196, a Montgomery operation unit 195, a memory 198 and an output unit 197. The operating procedure of the modular exponentiation arithmetic unit 190 will now be described.

(1) First, $x_0$, e, n, R, $R_R$, S are fed into the input buffer 194, whence e, s are input to the decision unit 196. The decision unit 196 separates e into k bits of [$e_k$, $e_{k-1}$, ... $e_2$, $e_1$]. Furthermore, i=0, j=k are set in two counters (not shown) with respect to i, j provided in the decision unit 196. The values of R, N fed in the input buffer 194 are set in the Montgomery operation unit 195, and the initial value $x_0$ and $R_R$ of the Montgomery operation are held in the memory 198.

(2) On the basis of $x_0$, $R_R$ in memory 198, $y_0$ is calculated in the Montgomery operation unit 195 and is held in the memory 198 as the initial value of the Montgomery operation together with $y_1=R$.

(3) With respect to i=0, j=k, the decision circuit renders the decisions $e_j=1$, j>1 and outputs an address signal to the memory 198 in dependence upon the decisions. The memory 198 holds $y_i$ and $y_{i+1}$, but $y_{i+1}$ is updated from time to time by the output of the Montgomery operation unit 195. The memory 198 stores the output $y_{i+1}$ of the Montgomery operation in response to the address signal from the decision unit 196. Further, in dependence upon the address signal from the decision unit 196, the content of the memory 198 is read out and $y_{i+1}$ or $y_i$ enters the Montgomery operating unit 195. The Montgomery operation unit 195 performs the Montgomery operation in accordance with the output from the memory 198. The counter for j in the decision unit 196 is decremented by one count and this procedure is repeated until j=0 is attained.

(4) When j=0 is established, the decision unit 196 issues an enable signal to the output unit 197, which latches $y_{i+1}$ prevailing at the time of j=0. The output unit 197 outputs the latched $y_{i+1}$ as the result of the modular exponentiation operation and, at the same time, $y_{i+1}$ is held in the memory 198 as the next input of the Montgomery operation unit 195. The counter for i in the decision unit 196 is incremented by one count, and steps (3), (4) of this procedure are repeated until i=s is attained.

(5) The procedure is terminated.

The output of the modular exponentiation arithmetic unit 190 enters the logical operation unit 191. The latter generates and outputs random numbers from an arbitrary bit (or bits) in a range of lower-order $\log_2 n$ (where n represents the number of digits of N in binary notation) bits of each of the entered $y_1$, $y_2$ ....

The logical operation unit 191 is capable of outputting, as a pseudorandom number, arbitrary bits in a range of lower-order $\log_2 n$ bits of each of the entered $y_1$, $y_2$, .... For example, all of the lower-order $\log_2 n$ bits may be outputted as a pseudorandom number or only the least significant bit may be outputted as a pseudorandom number.

In a case where the logical operation unit is constituted by hardware, for example, it can be made by using a parallel-input, serial-output shift register which latches the entered $y_i$ (i=1, 2, ... ) in parallel and sequentially outputs, in serial form, the lower order $\log_2 n$ bits.

In accordance with the fourth embodiment, as described in detail above, use is made of the computation procedure of Algorithm 3, which dispenses with the processing of equation (*3), which is necessary in the prior art in Algorithm 2.

As a result, a sequence of pseudorandom numbers having the same degree of a security as that of Equation (B-3) can be generated at high speed or by circuitry of smaller scale.

Thus, as described above, generation/reproduction of communication data can be performed at a high speed using the pseudorandom numbers generated by the method and apparatus of the fourth embodiment.

<Fifth Embodiment>

The purpose of the pseudorandom number generator according to the fifth embodiment is to eliminate both of the operations indicated by equation (*1) and equation (*3) of the above-described Algorithm 2, thereby making it possible to generate a sequence of pseudorandom numbers at a higher speed or by circuitry of smaller scale while maintaining a degree of security the same as that of Equation (B-3).

Algorithm 4 of the fifth embodiment is as follows:

```
[Algorithm 4]
INPUT y_0 (= x_0), e, N, R
FOR i = 0 TO s
    y_{i+1} = R
    FOR j = k TO 1
        IF e_j = 1 THEN y_{i+1} = Mont(y_{i+1}, y_i)
        IF j > 1 THEN y_{i+1} = Mont(y_{i+1}, y_{i+1})
    NEXT
    OUTPUT y_{i+1} (= R^{-(e-1)} · y_i^e mod N)
NEXT,
```

The series $y_i$ (i=0, 1, 2, ..., s) obtained by executing this algorithm is represented by the following using R, which is relatively prime with respect to N:

$$y_0 = x_0 \bmod N \tag{B-26}$$

$$y_{i+1} = R^{-(e-1)} \cdot y_i^e \bmod N \ (i=0, 1, 2, \ldots) \tag{B-27}$$

In this case, when the sequence $x_i$ (i=0, 1, 2, ...) generated by Equation (B-3) and the sequence $y_i$ (i=0, 1, 2, ...) generated by Equation (B-27) are compared, we have $$y_i = R^{**}(1-e^i) \cdot x_i \bmod N \ (i=0, 1, 2, \ldots). \tag{B-28}$$

Here "$R^{**}(1-e^i)$" signifies the $(1-e^i)$th power of R.

A pseudorandom generator according to the fifth embodiment in which equations (*1), (*3) in Algorithm 2 are eliminated using $a_i'$ obtained in accordance with $$a_i' = lsb(y_i) \ (i=0, 1, 2, \ldots) \tag{B-29}$$

from $y_i$ of Equation (B-27) as a cryptologically secure sequence of pseudorandom numbers.

In terms of security, this case also can be said to be the same as that in which equation (*3) in Algorithm 2 is eliminated. The series $y_i$ (i=0, 1, 2, ...) obtained by Equation (B-27) are values obtained by multiplying the series $x_i$ (i=0, 1, 2, ...), which is obtained by Equation (B-3), by the constant $R^{**}(1-e^{i+1})$ and taking the residue at N [See Equation (B-28)].

Accordingly, if it is very difficult to obtain $b_i = lsb(x_i)$ from $x_{i+1}$, then it will also be very difficult to obtain $$a_i' = lsb(y_i) \ (=lsb((R^{**}(1-e^{i+1}) \cdot x_i) \bmod N))$$

from $y_{i+1}$ $(=(R^{}(1-e^{i+1}) \cdot x_{i+1}) \bmod N)$, which is the result of multiplying $x_{i+1}$ by the constant $R^{}(1-e^{i+1})$ and taking the residue modulo N. In other words, since $a_i'$ is a hard core bit of $y_{i+1}$, the security of pseudorandom number generation using Equations (B-27) and (B-29) also is the same as that of pseudorandom number generation using Equation (B-3).

Figure 12:
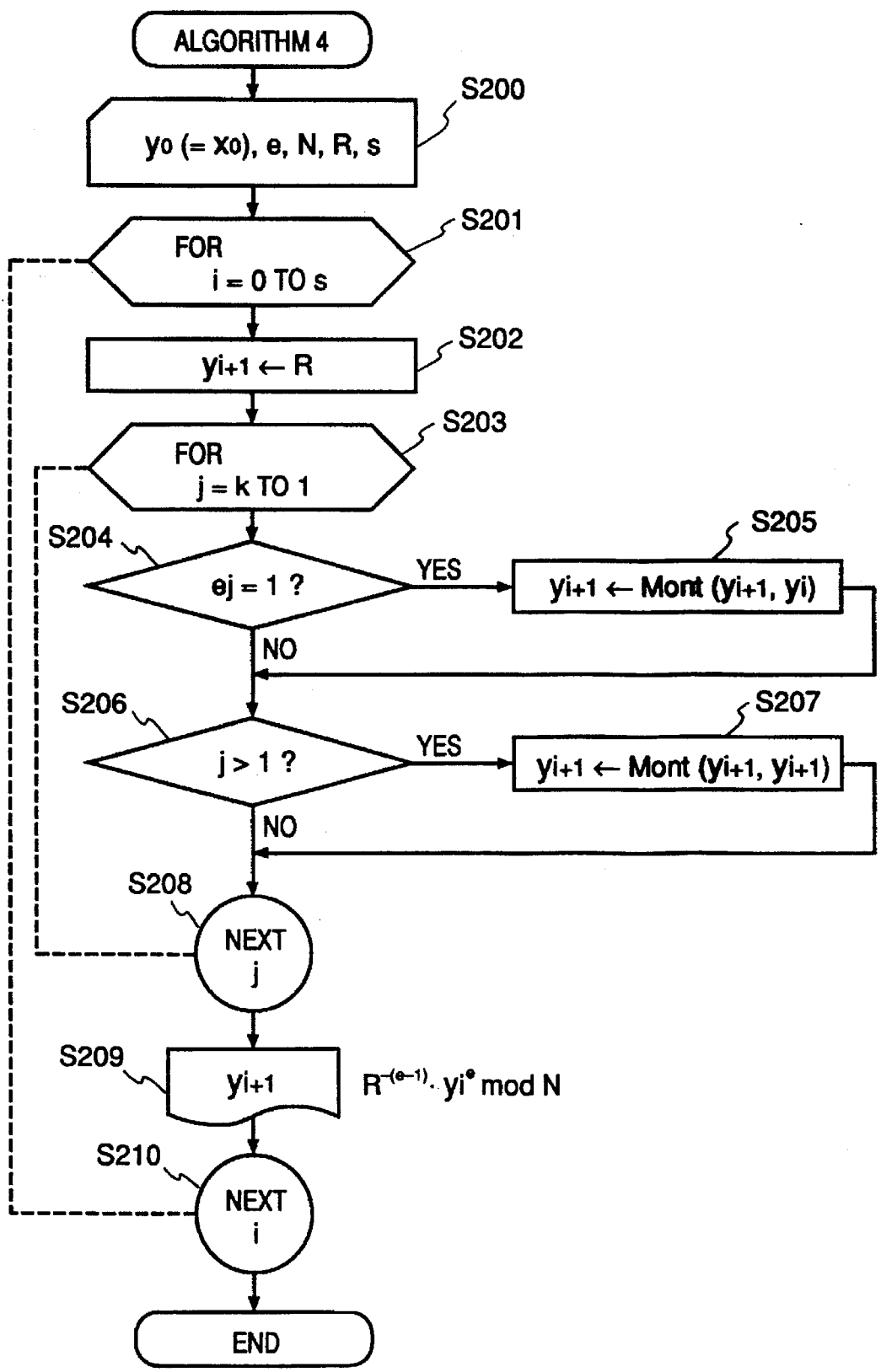
FIG. 12 is a flowchart of a program for generating pseudorandom numbers according to the fifth embodiment.

A flowchart for executing Algorithm 4 will now be described with reference to FIG. 12.

Values of $y_0$, e, N, s and R are entered at step S200. Here s is the number of repetitions of the residual operation.

A counter i of repetitions of the residual operation first is initialized to "0" at step S201. Whenever this step is entered, the counter i is incremented and processing proceeds to the next step. The count-up operation is performed up to s.

Next, at step S202, R is substituted for $y_{i+1}$.

This is followed by step S203, at which a bit pointer j for pointing to each bit of e is first set at k. Here k is the bit length of e and is assumed to be set in advance. Whenever this step is entered, a bit pointer j is decremented and processing proceeds to the next step. The countdown proceeds to 1.

At step S204, it is determined whether the j-th bit $e_j$ designated by the bit pointer j is "1" or not. If the bit $e_j$ is "1", the program proceeds to step S205, the operation Mont $(y_{i+1}, y_i)$ is performed and the result is set as $y_{i+1}$. If the bit $e_j$ is "0", the program proceeds to step S206.

It is determined at step S206 whether the bit pointer j is greater than "1" or not. If j is not greater than "1", then the program proceeds to step S208. If j is greater than or equal to "1", the program proceeds to step S207, the operation "Mont $(y_{i+1}, y_{i+1})$" is performed and the result is set as $y_{i+1}$.

Next, at step S208, it is determined whether the bit pointer j is a value in the interval "k~1". If j is a value in this interval, then the program returns to the residual processing from step S203 onward. If j is outside this interval, then the program proceeds to step S209.

At step S209, $y_{i+1}$ (i=0, 1, 2, ...) is stored in a memory device or the like.

Next, at step S210, it is determined whether the counter i is a value in the interval "0~s". If i is a value in this interval, then the program returns to modular multiplication from step S201 onward and the next residual processing operation is performed. If i is outside this interval, then residual processing is terminated.

Figure 13:
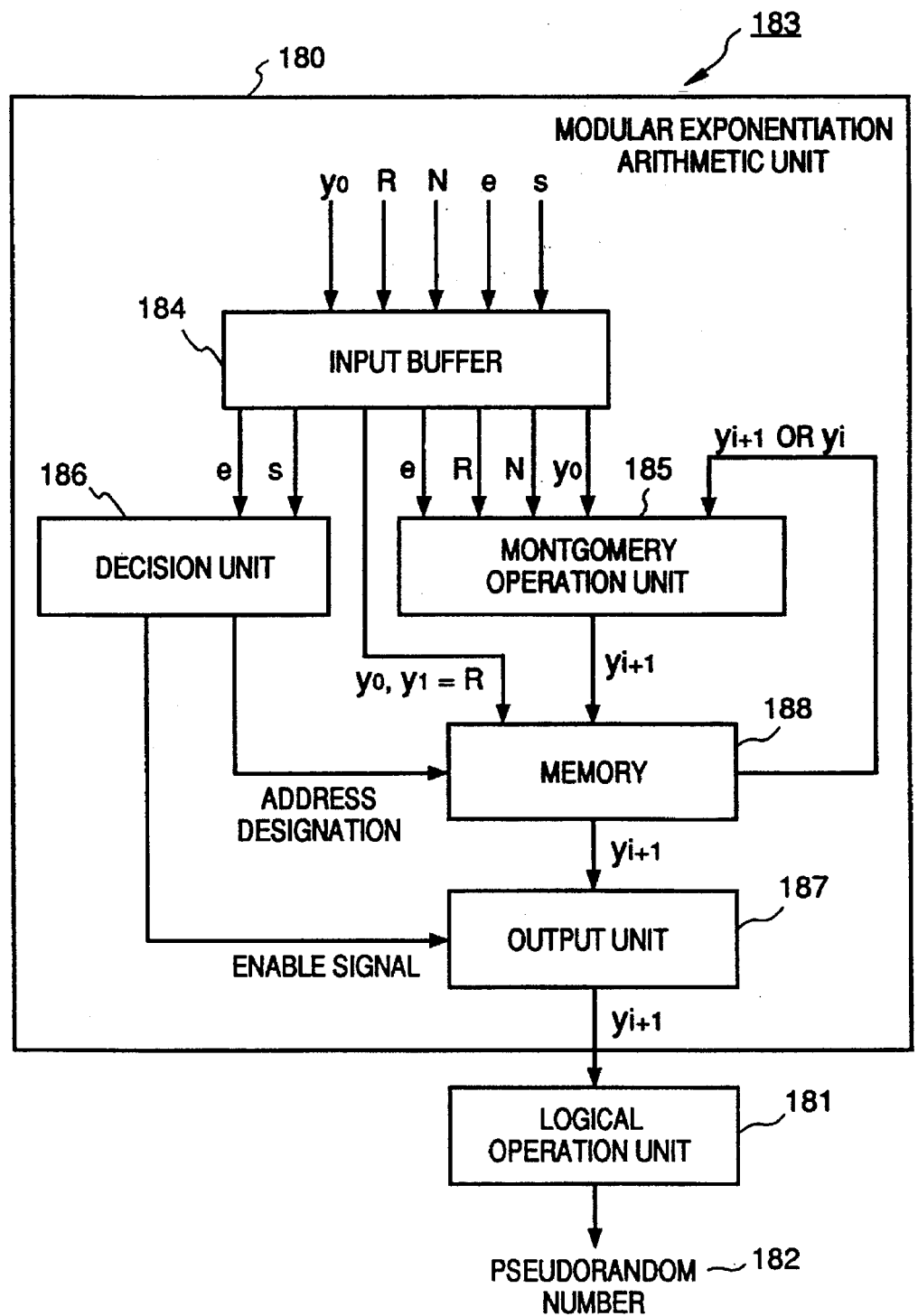
FIG. 13 is a block diagram showing an example of the configuration of a modular multiplication circuit according to the fifth embodiment.

FIG. 13 is a diagram showing the configuration of a pseudorandom number generator 183 according to the fifth embodiment of the present invention. The pseudorandom number generator 183 has a modular exponentiation arithmetic unit 180 and a logical operation unit 181. The modular exponentiation arithmetic unit 180, which executes processing in accordance with Algorithm 4, has an input buffer 184 whose inputs are the initial value $y_0$, N, which is the modulus of the residual operation, the arbitrary constant R, which is a relatively prime number with respect to N, and the power e. These inputs are made using the keyboard 11. Upon receiving the values of the inputs N, R, $y_0$ and e from the input buffer 184, a Montgomery operation unit 185 performs an operation corresponding to the following equation to successively obtain a sequence of numbers $y_{i+1}$ (i=0, 1, 2, ...), namely $y_1, y_2, \ldots$ :

$$y_{i+1} = R^{-(e-1)} \cdot y_i^e \bmod N \ (i=0, 1, 2, \ldots) \tag{B-30}$$

where

N=p·q p, q are prime numbers e: an arbitrary constant which satisfies $e \geq 2$.

It should be noted that p, q are assumed to have been set in advance and that N (=p·q) is assumed to have been computed in advance. The actual operational method used by the Montgomery operation unit 185 is not one in which the above equation is computed directly. Rather, the unit 185 applies the Montgomery method and performs an operation based upon equivalent equations indicated by Equations (B-7)–(B-9).

More specifically, the operation Mont (u,v) based upon the Montgomery method used in Algorithm 4 performs the operations of Equations (B-7)–(B-9) mentioned above.

Since N is an odd number, R and N are relatively prime integers if $R=2^t$ holds (where t is an arbitrary integer). In this case, division by R and a residual operation are essentially unnecessary operations and Mont (u,v) can be computed at a high speed by multiplication and addition. Accordingly, a modular exponentiation operation capable of being implemented by repeated operations based upon the Montgomery method can be performed at a high speed as well.

In a modular exponentiation operation, Algorithm 4 is executed. The inputs to the input buffer 184 of the modular exponentiation arithmetic unit 180 are the initial value $y_0$ $(=x_0)$, the power e, the modulus N of the operation, the constant R and the number s of repeated operations with respect to i. An output unit 187 of the modular exponentiation arithmetic unit 180 successively outputs $y_{i+1}$ (i=0, 1, . . . , s). The modular exponentiation arithmetic unit 180 includes the input buffer 184, a decision unit 186, the Montgomery operation unit 185, a memory 188 and an output unit 187. The operating procedure of the modular exponentiation arithmetic unit 180 will now be described.

(1) First, $y_0=(x_0)$, e, n, R, s are fed into the input buffer 184, whence e, s are input to the decision unit 186. The latter separates e into k bits of $[e_k, e_{k-1}, \ldots e_2, e_1]$. Furthermore, i=0, j=k are set in two counters with respect to i, j provided in the decision unit 186. The values of R, N fed in the input buffer 184 are set in the Montgomery operation unit 185, and the initial value $y_0$ and $y_1=R$ of the Montgomery operation are held in the memory 188.

(2) With respect to i=0, j=k, the decision circuit renders the decisions $e_j=1$, j>1 and outputs an address signal to the memory 188 in dependence upon the decisions. The memory 188 holds $y_i$ and $y_{i+1}$, but $y_{i+1}$ is updated from time to time by the output of the Montgomery operation unit 185. The memory 188 stores the output $y_{i+1}$ of the Montgomery operation unit 185 in response to the address signal from the decision unit 186. Further, in dependence upon the address signal from the decision unit 186, the content of the memory 188 is read out and $y_{i+1}$ or $y_i$ enters the Montgomery arithmetic unit 185. The Montgomery arithmetic unit 185 performs the Montgomery operation in accordance with the output from the memory 188. The counter for j in the decision unit 186 is decremented by one count and this procedure is repeated until j=0 is attained.

(3) If j=0 is established, the decision unit 186 issues an enable signal to the output unit 187, which latches $y_{i+1}$ prevailing at the time of j=0. The output unit 187 outputs the latched $y_{i+1}$ as the result of the modular exponential operation and, at the same time, $y_{i+1}$ is held in the memory 188 as the next input of the Montgomery arithmetic unit 185. The counter for i in the decision unit 186 is incremented by one count, and steps (2), (3) of this procedure are repeated until i=s is attained.

(4) The procedure is terminated.

The input buffer 184 is constituted by a register for latching and holding each of the input values $y_0$ $(=x_0)$, e, N and R. The decision unit 186 can be constructed from a comparator for judging $e_j=1$ and j>1, a counter for counting i and j and a logic circuit for outputting an address designating signal and an enable signal. The memory 188 can be a RAM capable of being written/read at random, and the output unit 187 can be a register for latching and holding the output value of $y_{i+1}$ in dependence upon the enable signal from the decision unit 186.

In a case where the means for performing the Montgomery method is constituted by hardware, the basic components are an adder, a multiplier and a shifter which performs a bit shift in order to implement a modular multiplication operation based upon R. Furthermore, use can be made of a Montgomery arithmetic circuit illustrated in the literature "Exponential Algorithm and Systolic Array Using the Montgomery Method" (Iwamura, Matsumoto, Imai; *Shingaku Giho*, vol. 92, No. 134, pp. 49–54, 1992).

The output of the modular exponentiation arithmetic unit 180 enters the logical operation unit 181. The latter generates and outputs pseudorandom numbers from an arbitrary bit (or bits) in a range of lower-order $\log_2 n$ (where n represents the number of digits of N in binary notation) bits of each of the entered $y_1, y_2 \ldots$.

The logical operation unit 181 is capable of outputting, as a pseudorandom number, arbitrary bits in the range of lower-order $\log_2 n$ bits of each of the entered $y_1, y_2 \ldots$. For example, all of the lower-order $\log_2 n$ bits may be outputted as a pseudorandom number or only the least significant bit may be outputted as a pseudorandom number.

In a case where the logical operation unit is constituted by hardware, for example, use can be made of a parallel-input, serial-output shift register which latches the entered $y_i$ (i=1, 2, . . . ) in parallel and sequentially outputs, in serial form, the lower-order $\log_2 n$ bits.

In accordance with the fifth embodiment, as described in detail above, use is made of the computation procedure of Algorithm 4, which dispenses with the processing of equations (*1) and (*3), which are necessary in the prior art in Algorithm 2. As a result, a sequence of pseudorandom numbers having the same degree of security as that of Equation (B-3) can be generated at a high speed or by circuitry of a smaller scale.

In this case, in addition to speeding up the modular multiplication operation based upon use of the Montgomery method, it is possible to dispense with a conversion for inputs and a conversion for obtaining an output as is necessary in Algorithm 2. As a result, an increase in the speed of overall operation can be expected.

Thus, as described above, generation/reproduction of communication data can be generated by the method and apparatus of the fifth embodiment.

<Sixth Embodiment>

The third through fifth embodiments described above illustrate methods of generating pseudorandom numbers by the Montgomery method. In general, however, a residual operation can be applied to a number $C \cdot x^e$, which is obtained by multiplying the result $x^e$ of a power operation by an arbitrary constant C, and pseudorandom numbers can be generated from prescribed bits of $y = C \cdot x^e \bmod N$ obtained as a result.

Figure 14:
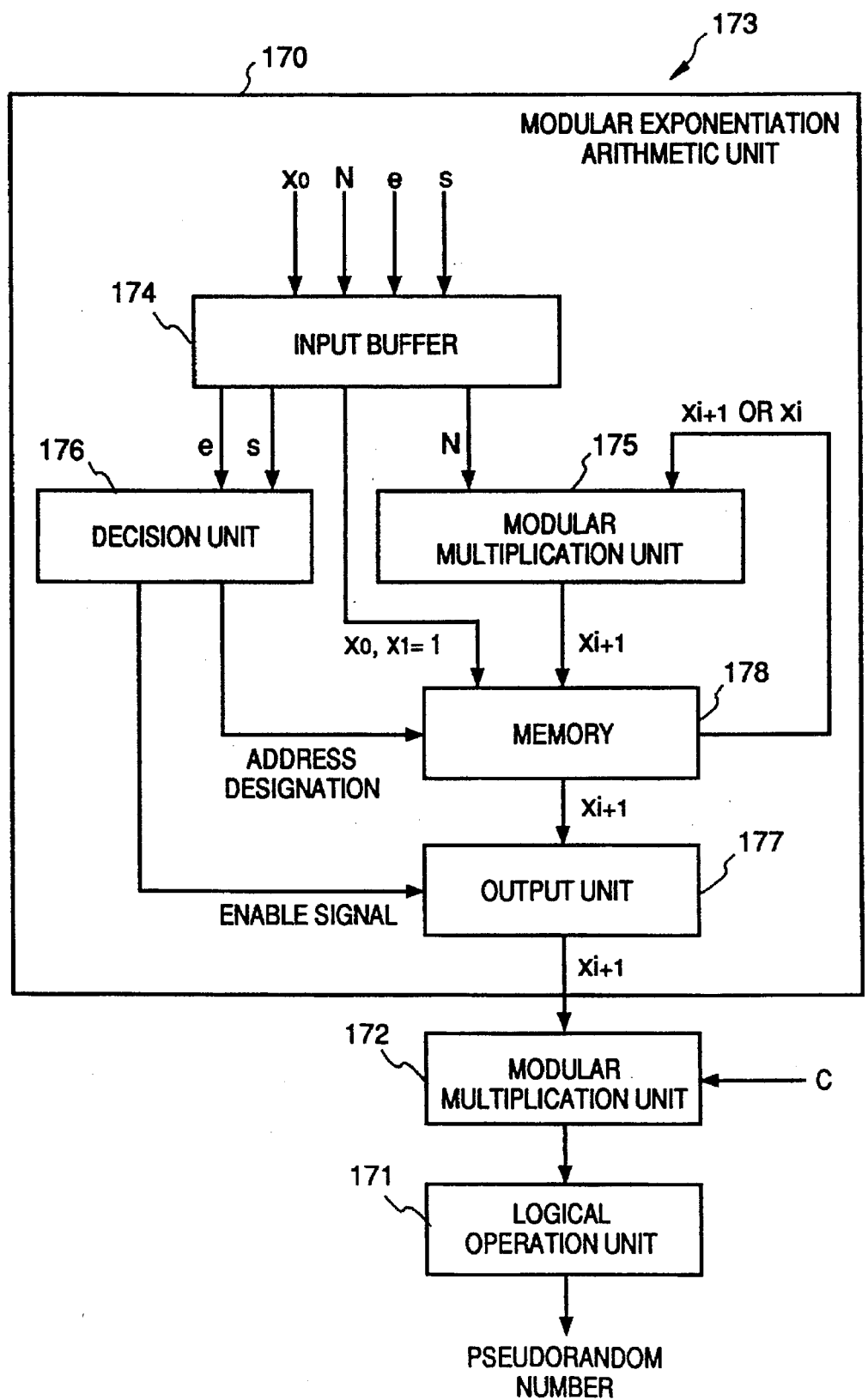
FIG. 14 is a block diagram showing an example of the configuration of a modular multiplication circuit according to the sixth embodiment.

FIG. 14 is a block diagram showing the configuration of pseudorandom number generator 173 according to the sixth embodiment. A modular exponentiation arithmetic unit 170 performs the operation, which is indicated by the following equation, in the form of a chain to generate $x_1, x_2$ from the initial value $x_0$, N, which is the modulus of the residual operation, and the power e:

$$x_{i+1} = x_i^e \bmod N \ (i=0, 1, 2, \ldots) \quad \text{(B-31)}$$

where $N = p \cdot q$ p, q are prime numbers e ($\geq 2$): an arbitrary constant.

The modular multiplication unit 172 generates $y_1, y_2, \ldots y$ performing the following operation:

$$y_{i+1} = C \cdot x_{i+1} \bmod N \ (i=0, 1, 2, \ldots) \tag{B-32}$$

from the input value $x_{i+1}$ ($i=0, 1, 2, \ldots$) and N, which is the modulus of the residual operation.

The modular exponentiation arithmetic unit 170 executes Algorithm 1. The inputs to the modular exponentiation arithmetic unit 170 are the initial value $x_0$, the power e, the modulus N of the arithmetic operation and the number of repetitions s with regard to i. The modular exponentiation arithmetic unit 170, which successively outputs $x_{i+1}$ ($i=0, 1, \ldots, s$), comprises an input buffer 174, a decision unit 176, a modular multiplication unit 175, a memory 178 and an output unit 177.

The operating procedure of the modular exponentiation arithmetic unit 170 will now be described.

(1) First, $x_0$, e, N and s are fed into the input buffer 174, whence e, s are input to the decision unit 176. The latter separates e into k bits of $[e_k, e_{k-1}, \ldots e_2, e_1]$. Furthermore, $i=0$, $j=k$ are set in two counters (not shown) with respect to i, j provided in the decision unit 176. The values of R, N fed in the input buffer 174 are set in the modular multiplication unit 175, and the initial value $x_0$ and $x_1=1$ of the modular multiplication operation are held in the memory 178.

(2) With respect to $i=0$, $j=k$, the decision unit 176 renders the decisions $e_j=1$, $j>1$ and outputs an address signal to the memory 178 in dependence upon the decisions. The memory 178 holds $x_i$ and $x_{i+1}$, but $x_{i+1}$ is updated from time to time by the output of the modular multiplication unit 175. The memory 178 stores the output $x_{i+1}$ of the modular multiplication operation in response to the address signal from the decision unit 176. Further, in dependence upon the address signal from the decision unit 176, the content of the memory 178 is read out and $x_{i+1}$ or $x_i$ is outputted to the modular multiplication unit 175. The modular multiplication unit 175 performs modular multiplication in accordance with the output from the memory 178. The counter for j in the decision unit 176 is decremented by one count and this procedure is repeated until $j=0$ is attained.

(3) If $j=0$ is established, the decision unit 176 issues an enable signal to the output unit 177, which latches $x_{i+1}$ prevailing at the time of $j=0$. The output unit 177 outputs the latched $x_{i+1}$ as the result of the modular exponentiation operation and, at the same time, $x_{i+1}$ is held in the memory 178 as the next input of the modular multiplication unit 175. The counter for i in the decision unit 176 is incremented by one count, and steps (2), (3) of this procedure are repeated until $i=s$ is attained.

(4) The procedure is terminated.

The input buffer 174 is constituted by a register for latching and holding each of the input values $x_0$, e, N and s. The decision unit 176 can be constructed from a comparator for judging $e_j=1$ and $j>1$, a counter for counting j and a logic circuit for outputting an address designating signal and an enable signal. The memory 178 can be a RAM capable of being written/read at random, and the output unit 177 can be a register for latching and holding the output value of $x_{i+1}$ in dependence upon the enable signal from the decision unit 176.

Thus, as set forth above, the modular exponentiation operation can be realized by repeating modular multiplication. In a case where the modular multiplication operation by the modular exponentiation operation unit 170 and modular multiplication unit is implemented by hardware, for example, it is also possible to use a modular multiplication method illustrated in the literature "Method of Constructing RSA Encryption Device by Parallel Processing" (Iwamura, Matsumoto, Imai; *Denshi Joho Tsushin Gakkai Ronbun* A, vol. J75-A, No. 8, pp. 1301~1311, 1992).

The output of a modular multiplication unit 172 enters a logical operation unit 171. The latter generates and outputs pseudorandom numbers from an arbitrary bit (or bits) in a range of lower-order $\log_2 n$ (where n represents the number of digits of N in binary notation) bits of each of the entered $y_1, y_2, \ldots$.

The logical operation unit 171 is capable of outputting, as a pseudorandom number, arbitrary bits in a range of lower-order $\log_2 n$ bits of each of the entered $y_1, y_2, \ldots$. For example, all of the lower-order $\log_2 n$ bits may be outputted as a pseudorandom number or only the least significant bit may be outputted as a pseudorandom number.

Thus, as described above, generation/reproduction of communication data can be performed at high speed using the pseudorandom numbers generated by the method and apparatus of this embodiment.

<Seventh Embodiment>

As described thus far, pseudorandom numbers generated by the method of generating pseudorandom numbers set forth above is strongly resistant to analysis and, as a result, secure, encrypted communication can be realized by using these pseudorandom numbers in encryption. An application in encrypted communication using the random number generator of the foregoing embodiments will now be described in an encrypted communication network based upon encryption (stream encryption) in which an exclusive-OR operation is performed, bit by bit, between a communication text and random numbers.

Figure 15:
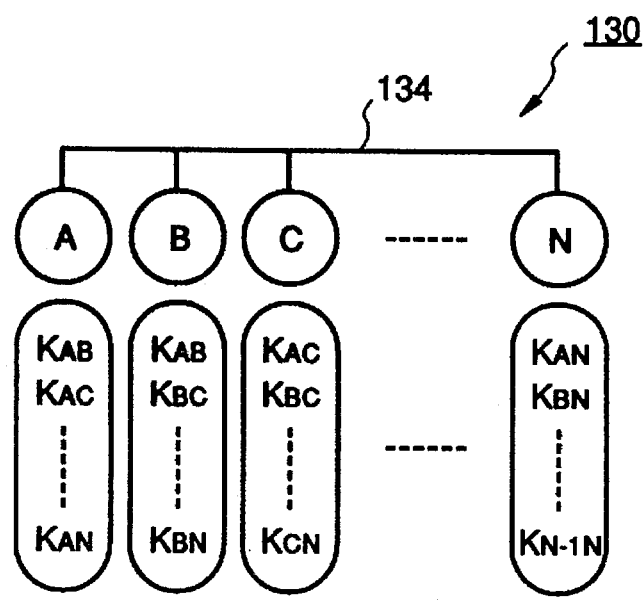
FIG. 15 is a diagram showing a common-key encrypted communication network according to a seventh embodiment.

FIG. 15 is a diagram showing a common-key encrypted communication network 130 in which a specific and secret encryption key is possessed by the subscribers to the network. The subscribers to the network are A, B, C, ..., N. A communication network 134 makes possible communication among the subscribers A, B, C, ..., N. Symbols $K_{AB}$, $K_{AC}$, ... in the circles under the subscribers A, B, C, ..., N signify encryption keys shared by subscribers. For example, symbols $K_{AB}$, $K_{AC}$, ... indicate encryption keys shared by subscribers A–B, subscribers A–C, ..., respectively.

Figure 16:
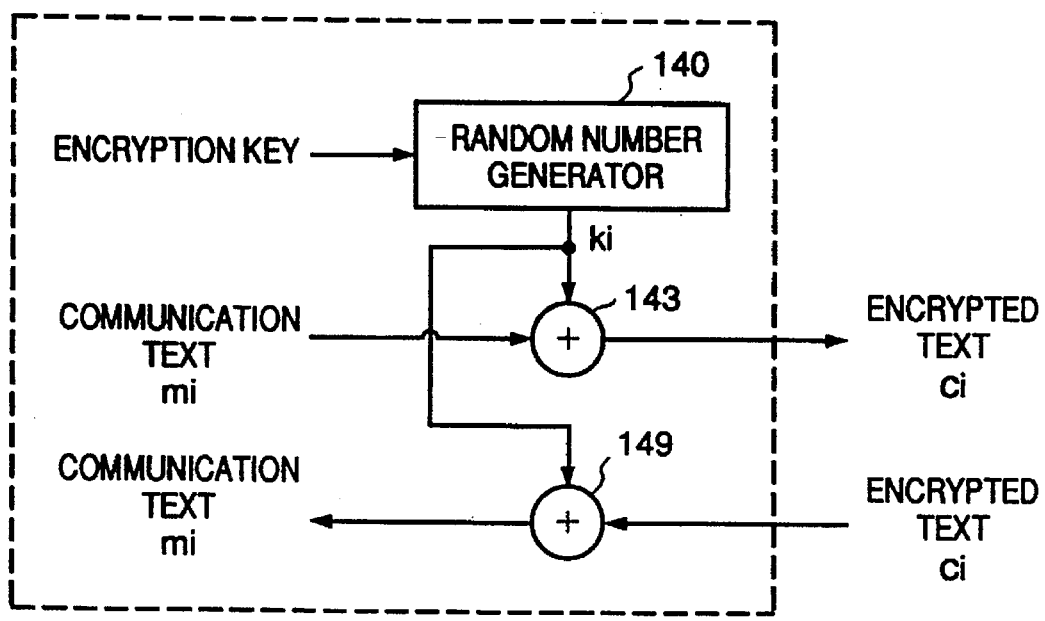
FIG. 16 is a diagram showing the construction of a communication apparatus according to the seventh embodiment.

FIG. 16 is a block diagram showing the construction of a communication apparatus which includes an encryption device and a decryption device both using the random number generator of this embodiment.

In FIG. 16, a random number generator 140 generates a sequence of pseudorandom numbers in accordance with any of the third through sixth embodiments described above. A gate 143 outputs the exclusive-OR between a communication text and a pseudorandom number outputted by the random number generator 140 and delivers the result of this operation as an encrypted text. On the other, an input encrypted text is applied to a gate 149, which takes the exclusive-OR between this text and a pseudorandom number from the random number generator 140, thereby decoding the encrypted text into a communication text.

Figure 17:
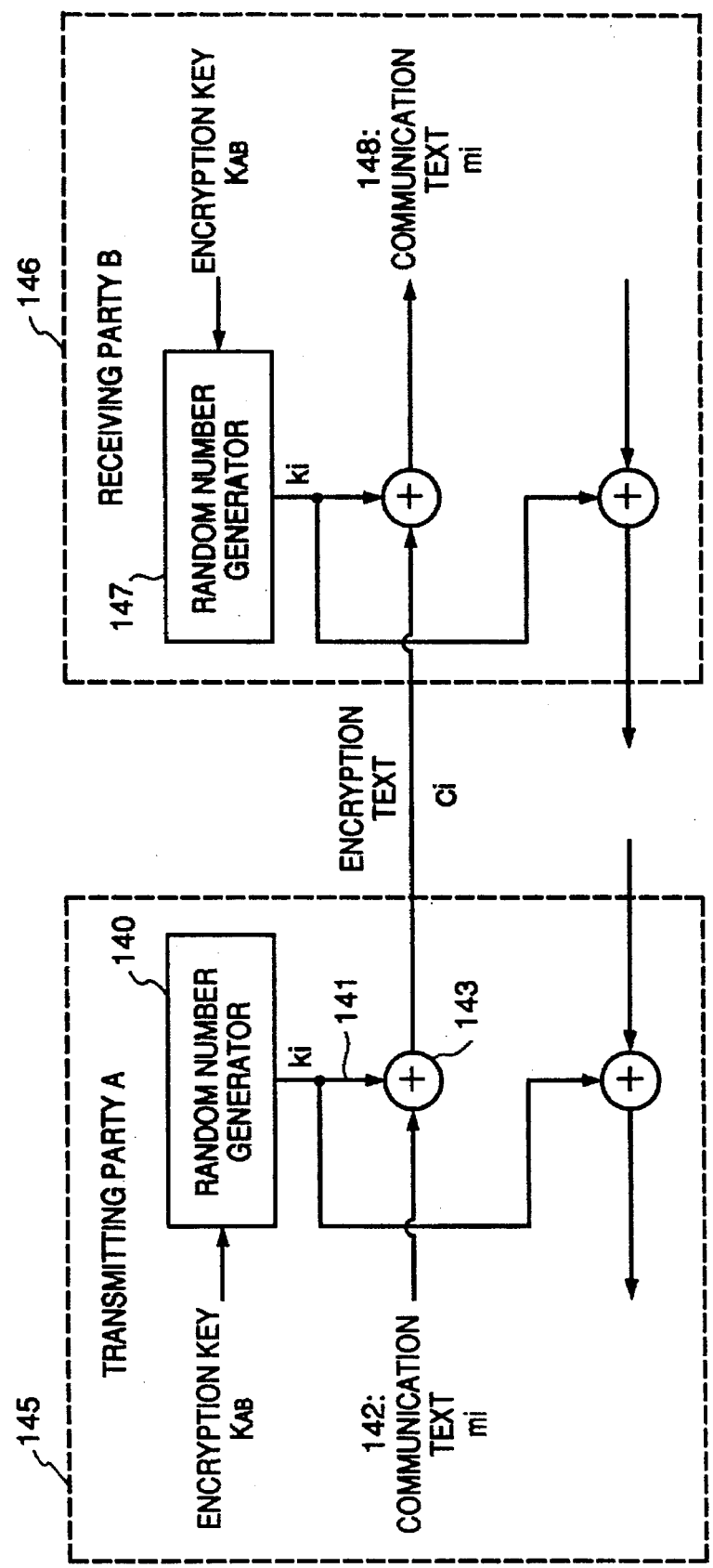
FIG. 17 is a diagram showing secret communication in an encrypted communication system according to the seventh embodiment.

FIG. 17 is a diagram showing secret communication between A and B in the encrypted communication system illustrated in FIGS. 15 and 16.

In FIG. 17, encrypted communication from a receiver 145 used by a transmitting party A to a receiver 146 used by a receiving party B is carried out through the following procedure:

(1) The transmitting party A sets all or part of the secret key $K_{AB}$, which is shared with receiving party B, in the random number generator 140 as the initial value thereof and generates a random-number sequence $k_i$ (141).

(2) An exclusive-OR gate 143 computes, bit by bit, the exclusive-OR "$m_i$ (+) $k_i$" between the random-number sequence $k_i$ (141) generated by the transmitting party A and a communication text $m_i$ (142) created in advance, and transmits the result, namely an encrypted text $c_i$, to the receiver 146.

(3) The receiving party B sets all or part of the secret key $K_{AB}$, which is shared with transmitting party A, in a random number generator 147 as the initial value thereof and generates a random-number sequence $k_i$.

(4) The receiving party B takes the exclusive-OR "$c_i$ (+) $k_i$" between the generated random-number sequence $k_i$ and the received encrypted text $c_i$ (142) created in advance, whereby the output thereof is restored as the communication text $m_i$ (148).

In accordance with this procedure, only the legitimate receiving party B knows the secret key $K_{AB}$ and therefore is capable of decrypting the received encrypted text into the original communication text. Other subscribers (C~N) do not know the secret key used at the time of the encrypted text and therefore cannot determine the content of the text. Secret communication is thus achieved.

In a portable network in which an encryption key is not distributed beforehand as in FIG. 15 but is required to be owned jointly by the transmitting and receiving parties before encrypted communication, it is possible to realize encrypted communication through the same procedure if well-known key distribution is carried out.

In the encrypted communication network illustrated in the seventh embodiment, a specific and secret key is shared by the parties transmitting and receiving a communication text. As a result, the fact that an encrypted text can be received and decoded into a meaningful communication text assures the receiving party of the fact that the communication text has been transmitted from another party possessing the key. Accordingly, with the secret communication system according to the seventh embodiment, authentication of transmitting and receiving parties in communication can be performed as well.

Thus, as described above, generation/reproduction of communication data can be performed at a high speed using the pseudorandom numbers generated by the method and apparatus of this embodiment.

<Eighth Embodiment>

In a network of the type in which an encryption key is not distributed beforehand as in the seventh embodiment but is required to be owned jointly by the transmitting and receiving parties before encrypted communication, the well-known Diffie-Hellman method is available in which the encryption key can be shared safely even in a case where communication takes place over a communication line that is susceptible to wire tapping (W. Diffie and M. E. Hellman, "Direction in Cryptography", IEEE, IT, vol. IT-22, No. 6, 1976). The random numbers generated by the third through sixth embodiments can be used as the random numbers employed in this method.

Since the transmitting party and receiving party need not possess the same random numbers used in this case, the initial value set in the random number generators in each party may be any respective value.

In a case where cryptologically secure pseudorandom numbers are generated by the Montgomery method in accordance with the embodiment described in detail above, using prescribed bits of $y_i$, obtained by Equation (B-15) or (B-25), as pseudorandom numbers makes it unnecessary to perform the operation of equation (*3) or equation (*1) and equation (*3), which is required in the prior art. As a result, it is possible to generate pseudorandom numbers having a degree of security the same as that of the prior art at a higher speed or with circuitry of a smaller scale. Further, generation/reproduction of communication data can be performed at high speed using the pseudorandom numbers generated.

Thus, in accordance with the third through eighth embodiments as described above, secure pseudorandom numbers can be generated at a higher speed and more easily and generation/reproduction of communication data can be performed at a high speed.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:

generating means for generating a sequence of numbers $X_i$ (i=1, 2, ...) by the following recurrence formula $X_{i+1}=\{X_i^2+(X_i^2 \cdot (-N^{-1} \bmod R) \bmod R) \cdot N\}/R$ on the basis of a prescribed initial value $X_0$, a prescribed odd number N and a prescribed number R which is a power of 2;

extracting means for extracting a prescribed portion from each number of the generated sequence of numbers to serve as a pseudorandom-number sequence; and communication means for encrypting or decrypting communication data by processing the communication data on the basis of the pseudorandom-number sequence.

2. The apparatus according to claim 1, wherein $2^t$ for an integer t is selected as the number R and a division by R in the recurrence formula is performed by a t-bit shift.

3. A communication apparatus comprising:

generating means for generating a sequence of numbers $X_i$ (i=1, 2, ...) by the recurrence formula $X_{i+1}=R^{-(e-1)} \cdot X_i^e \bmod N$, the recurrence formula being obtained by the following recursive operation $Q=\{X_i^2+(X_i^2 \cdot (-N^{-1} \bmod R) \bmod R) \cdot N\}/R$, on the basis of a prescribed initial value $X_0$, a prescribed odd number N and a prescribed number R which is a power of 2;

extracting means for extracting a prescribed portion from each number of the generated sequence of numbers to serve as a pseudorandom-number sequence; and communication means for encrypting or decrypting communication data by processing the communication data on the basis of the pseudorandom-number sequence.

4. The apparatus according to claim 1, wherein the prescribed portion is the least significant bit.

5. The apparatus according to claim 1, wherein the prescribed portion is chosen from among the lower order $\log_2 n$ bits, where n is the number of digits of N.

6. The apparatus according to claim 1, wherein said communication means performs an exclusive OR operation of the communication data and the pseudorandom-number sequence.

7. The apparatus according to claim 1, wherein the $x_0$ is selected so as to satisfy $0 \leq x_0 < 2N$ and R is set at $2^{n+2}$ with respect to n satisfying $N < 2^n$.

8. The apparatus according to claim 6, wherein said generating means includes a plurality of arithmetic circuits of identical construction connected in series.

9. The apparatus according to claim 3, wherein the prescribed portion is chosen from among the lower order $\log_2 n$ bits, where n is the number of digits of N.

10. The apparatus according to claim 3, wherein said communication means performs an exclusive OR operation of the communication data and the pseudorandom-number sequence.

11. A communication method comprising the steps of:

generating a sequence of numbers $X_i$ (i=1, 2, ...) by the following recurrence formula $X_{i+1} = \{X_i^2 + (X_i^2 \cdot (-N^{-1} \bmod R) \bmod R) \cdot N\}/R$ on the basis of a prescribed initial value $X_0$, a prescribed odd number N and a prescribed number R which is a power of 2;

extracting a prescribed portion from each number of the sequence of numbers to serve as a pseudorandom-number sequence; and encrypting or decrypting communication data by processing the communication data on the basis of the pseudorandom-number sequence.

12. A communication method comprising the steps of:

generating the sequence of numbers $X_i$ (i=1, 2, ...) by the recurrence formula $X_{i+1} = R^{-(e-1)} \cdot X_i^e \bmod N$, the recurrence formula being obtained by the following recursive operation $Q = \{X_i^2 + (X_i^2 \cdot (-N^{-1} \bmod R) \bmod R) \cdot N\}/R$ on the basis of a prescribed initial value $X_0$, a prescribed odd number N and a prescribed number R which is a power of 2;

extracting a prescribed portion from each number of the sequence of numbers to serve as a pseudorandom-number sequence; and encrypting or decrypting communication data by processing the communication data on the basis of the pseudorandom-number sequence.

13. The method according to claim 11, wherein the prescribed portion is the least significant bit.

14. The method according to claim 11, wherein the prescribed portion is chosen from among the lower order $\log_2 n$ bits, where n is the number of digits of N.

15. The method according to claim 11, wherein, in said communication data processing step, an exclusive OR operation is performed on the communication data and the pseudorandom-number sequence.

16. The method according to claim 12, wherein the prescribed portion is chosen from among the lower order $\log_2 n$ bits, where n is the number of digits of N.

17. The method according to claim 12, wherein, in said communication data processing step, an exclusive OR operation is performed on the communication data and the pseudorandom-number sequence.

18. The method according to claim 12, wherein the prescribed portion is the least significant bit.

* * * * *

UNITED STATES PATENT AND TRADEMARK OFFICE
CERTIFICATE OF CORRECTION

PATENT NO. : 5,666,419
DATED : Sept. 9, 1997
INVENTOR(S) : YAMAMOTO ET AL.

It is certified that error appears in the above-identified patent and that said Letters Patent is hereby corrected as shown below:

On the title page,

At [56] References Cited
U.S. PATENT DOCUMENTS
"4,747,848" should read -- 4,797,848
"5/1988" should read --1/1989--; and
insert "--Attorney, Agent, or Firm--Fitzpatrick, Cella, Harper & Scinto--.

Column 1

Line 45, "in" should read --in a--.

Column 2

Line 24, "integers)" should read --integers).--.

Column 3

Line 29, "bit).A" should have a paragraph break after --.--; and
Line 31, "information" should read --Information--; and
Line 39, "arbitrarily" should read --arbitrarly,--; and
Line 42, "least" should read --a least--; and
Line 65, "(B-5) should be right margin justified.

UNITED STATES PATENT AND TRADEMARK OFFICE
CERTIFICATE OF CORRECTION

PATENT NO. : 5,666,419

DATED : Sept. 9, 1997

INVENTOR(S) : YAMAMOTO ET AL.

It is certified that error appears in the above-identified patent and that said Letters Patent is hereby corrected as shown below:

Column 4

Line 11, "(B-6)" should be right margin justified; and
Line 58, "..)" should read --.., s)--; and
Line 61, "and." should read --and--.

Column 5

Line 16, "$=x^{ie}$" should read --$=x_i^e$--.

Column 6

Line 4, "Can" should read --can--; and
Line 7, "pseudo-random" should read --pseudorandom--.

Column 7

Line 56, "$4_{-1})$." should read --$4_{-3})$.--.

UNITED STATES PATENT AND TRADEMARK OFFICE
CERTIFICATE OF CORRECTION

PATENT NO. : 5,666,419
DATED : Sept. 9, 1997
INVENTOR(S) : YAMAMOTO ET AL.

It is certified that error appears in the above-identified patent and that said Letters Patent is hereby corrected as shown below:

Column 8

Line 7, "$\sim 6_{-1}$." should read --$\sim 6_{-n}$.--; and
Line 23, "to" should read --to the--; and
Line 25, "executed" should read --executed by--; and
Line 27, "refer" should read --refers--; and
Line 41, "1,then" should read --1, then--; and
Line 42, "1,then" should read --1, then--; and
Line 43, "Next" should read --NEXT--.

Column 9

Line 2, "modulo" should read --modulus--; and
Line 21, "are" should read --is--; and
Line 46, "the," should read --the--; and
Line 51, "time" should read --times--.

Column 10

Line 13, "time" should read --times--; and
Line 60, "RR" should read --RR--.

UNITED STATES PATENT AND TRADEMARK OFFICE
CERTIFICATE OF CORRECTION

PATENT NO. : 5,666,419

DATED : Sept. 9, 1997

INVENTOR(S) : YAMAMOTO ET AL.

It is certified that error appears in the above-identified patent and that said Letters Patent is hereby corrected as shown below:

Column 11

Line 37, "efficiently.Further," should have a paragraph break after --Further,--; and
    Line 64, "Sequence" should read --sequence--.

Column 12

Line 3, "namely" should read --namely.--; and
    Line 41, "Jacobi" should read --·Jacobi--.

Column 13

Line 65, "-$N^1$" should read --·$N^1$--; and
    Line 66, "R" should read --R.--.

Column 14

Line 40, "program" should read --program,--; and
    Line 45, "the it" should read --it--; and
    Line 47, "pseUdorandom" should read --pseudorandom--.

UNITED STATES PATENT AND TRADEMARK OFFICE
CERTIFICATE OF CORRECTION

PATENT NO. : 5,666,419

DATED : Sept. 9, 1997

INVENTOR(S) : YAMAMOTO ET AL.

It is certified that error appears in the above-identified patent and that said Letters Patent is hereby corrected as shown below:

Column 15

Line 15, "is has" should read --has--.

Column 16

Line 64, "numbers" should read --number--.

Column 17

Line 60, "...)" should read --...).--.

Column 18

Line 31, "operating" should read --operation--.

UNITED STATES PATENT AND TRADEMARK OFFICE
CERTIFICATE OF CORRECTION

PATENT NO. : 5,666,419

DATED : Sept. 9, 1997

INVENTOR(S) : YAMAMOTO ET AL.

Page 6 of 6

It is certified that error appears in the above-identified patent and that said Letters Patent is hereby corrected as shown below:

Column 19

Line 2, "of a" should read --of--; and
Line 3, "high" should read --a high-- and "of" should read --of a--; and
Line 14, "of" should read --of a--; and
Line 25, "NEXT," should read --NEXT.--; and
Line 46, "as" should read --is--.

Column 22

Line 55, "Of" should read --of--.

Column 23

Line 2, "y" should read --by--.

Column 24

Line 52, "other" should read --other hand--.

Signed and Sealed this

Twenty-eighth Day of April, 1998

BRUCE LEHMAN

Attest:

Attesting Officer

Commissioner of Patents and Trademarks